United States Patent
Privitera et al.

(10) Patent No.: US 10,966,049 B2
(45) Date of Patent: Mar. 30, 2021

(54) SYSTEMS AND METHODS TO COLLECT LOCATION DATA BY USING A DYNAMIC GEOFENCING METHODOLOGY

(71) Applicant: Cuebiq S.R.L., Milan (IT)

(72) Inventors: Filippo Privitera, Milan (IT); Carmelo Vecchio, San Pietro Vernotico (IT); Giulio Bider, Milan (IT); Antonio Tomarchio, New York, NY (US); Walter Ferrara, Milan (IT); William Nespoli, Mariano Comense (IT)

(73) Assignee: Cuebiq S.R.L.

( * ) Notice: Subject to any disclaimer, the term of this patent is extended or adjusted under 35 U.S.C. 154(b) by 353 days.

(21) Appl. No.: 15/393,620

(22) Filed: Dec. 29, 2016

(65) Prior Publication Data

US 2018/0192237 A1    Jul. 5, 2018

(51) Int. Cl.
*H04W 4/021* (2018.01)
*H04W 4/029* (2018.01)
*H04W 64/00* (2009.01)
*H04W 88/02* (2009.01)

(52) U.S. Cl.
CPC .......... *H04W 4/021* (2013.01); *H04W 64/00* (2013.01); *H04W 4/029* (2018.02); *H04W 88/02* (2013.01)

(58) Field of Classification Search
CPC ...... H04W 4/021; H04W 88/02; H04W 4/028
See application file for complete search history.

(56) References Cited

U.S. PATENT DOCUMENTS

| | | | |
|---|---|---|---|
| 8,965,406 B2 | 2/2015 | Henderson | |
| 9,043,329 B1 * | 5/2015 | Patton | G06F 17/3087 707/740 |
| 9,116,818 B2 | 8/2015 | Bilange et al. | |
| 9,445,230 B1 * | 9/2016 | Sipher | H04W 4/021 |
| 9,706,355 B1 * | 7/2017 | Cali | H04W 4/022 |
| 10,038,972 B1 * | 7/2018 | Feng | H04W 4/021 |

(Continued)

FOREIGN PATENT DOCUMENTS

| | | | | |
|---|---|---|---|---|
| WO | WO 2012/000107 | * | 5/2012 | ............. H04W 4/04 |
| WO | 2014031906 A1 | | 2/2014 | |
| WO | 2014036296 A1 | | 3/2014 | |

OTHER PUBLICATIONS

International Search Report from PCT/US2017/068639, dated Apr. 23, 2018, pp. 3.

*Primary Examiner* — Muthuswamy G Manoharan
(74) *Attorney, Agent, or Firm* — Lerner, David, Littenberg, Krumholz & Mentlik, LLP

(57) ABSTRACT

The present disclosure is directed to a method of enabling an application programmed on a mobile device to collect data. The application may operate in the background of the mobile device and be temporarily activated, and may be capable of collecting data while activated. The method may include receiving location data indicating a current location of the mobile device, generating a set of custom virtual borders around the current location, and instructing an operating system of the mobile device to temporarily activate the application when the mobile device crosses one or more of the custom virtual borders. The method is repeated upon temporary activation of the application, such that an updated set of custom virtual borders is generated when the mobile device crosses one or more of the previous custom virtual borders.

25 Claims, 20 Drawing Sheets

(56) References Cited

U.S. PATENT DOCUMENTS

| | | | |
|---|---|---|---|
| 2011/0167574 A1* | 7/2011 | Stout | G05D 1/0219 |
| | | | 15/3 |
| 2011/0256881 A1* | 10/2011 | Huang | H04W 4/021 |
| | | | 455/456.1 |
| 2013/0267253 A1* | 10/2013 | Case | H04W 4/021 |
| | | | 455/456.3 |
| 2014/0057648 A1* | 2/2014 | Lyman | H04W 4/021 |
| | | | 455/456.1 |
| 2014/0074874 A1* | 3/2014 | Fraccaroli | G06F 17/30595 |
| | | | 707/758 |
| 2014/0351328 A1 | 11/2014 | Woods et al. | |
| 2015/0024773 A1* | 1/2015 | Li | H04W 4/021 |
| | | | 455/456.1 |
| 2015/0181016 A1 | 6/2015 | Jain et al. | |
| 2016/0142872 A1* | 5/2016 | Nicholson | H04W 4/021 |
| | | | 455/456.1 |
| 2016/0286345 A1* | 9/2016 | MacDonald | H04W 4/02 |
| 2016/0292738 A1 | 10/2016 | Porter | |
| 2017/0034778 A1* | 2/2017 | Brunsman | H04W 52/0212 |

* cited by examiner

SYSTEMS AND METHODS TO COLLECT LOCATION DATA BY USING A DYNAMIC GEOFENCING METHODOLOGY

BACKGROUND OF THE INVENTION

Mobile devices such as smartphones and tablets are configured to allow users to install and run several third-party application programs, or apps. Some apps take advantage of the mobile device's preexisting hardware in order to improve the user's experience with the app. For instance, many smartphone apps collect, with the user's consent, location information using the smartphone's built-in location-determining hardware (e.g., global positioning system (GPS), indoor positioning system (IPS), etc.) in order to provide the user with an improved experience tailored to the user's specific location. Similarly, the apps can collect other types of data or information using other sensors or hardware included in the smartphone.

Device manufacturers and vendors often wish to retain the ability to fully control and manage what happens on the device. Moreover, continuously collecting data using a device's built-in hardware can drain the device's battery quickly. Therefore, mobile device operating systems are often configured to restrict apps from directly accessing the hardware. Instead, an app must send a request to collect data to the operating system, and the operating system determines when the app is permitted to run its code and collect data.

FIG. 1 is a block diagram showing an example configuration of a mobile device 100 with an application program (app) 140 running in the background. In the example, the app 140 includes a data collection module 142 that requests to collect data using hardware 120 (e.g., GPS) included in the mobile device. The request is sent to the operating system 110 via an application program interface (API) 130. The operating system 110 includes a program activation module 112 that determines whether or not to permit the app 140 to "wake up" and collect data while remaining in the background. The app 140 cannot interface with the hardware 120 via the API 130 unless the program activation module 112 permits it to do so. As a result, when the app 140 is running in the background of the mobile device 100, the app 140 is limited in terms of how frequently it can collect data, and thus how much data it can collect.

BRIEF SUMMARY OF THE INVENTION

The present disclosure provides systems and methods that increase the amount of data that the operating system of a mobile device allows to be collected by an app operating in the background of the mobile device. This increase in data collection is accomplished using an application or toolkit programmed on the device that dynamically generates a set of one or more geofences, or geofence-like borders, and instructs the operating system to wake up or activate the app when the mobile device crosses the dynamically generated geofences or borders. It should be recognized that the "set" of geofences or borders described herein does not require multiple borders, and may include as few as one border.

One aspect of the present disclosure is directed to a method of enabling an application programmed on a mobile device to collect data. The method includes receiving location data indicating a current location of the mobile device, generating a set of one or more custom virtual borders around the current location, and instructing an operating system of the mobile device to temporarily activate the application when the mobile device crosses one or more of the custom virtual borders, whereby the application is capable of collecting data while temporarily active. The method (the aforesaid receiving, generating, and instructing steps) is then repeated upon temporary activation of the application, such that a new custom virtual border is generated around the then-current location of the mobile device, as indicated by the location data received when the application is activated. In some examples, the method may further involve logging or otherwise collectively storing the repeatedly received location data, and instructing the mobile device to transmit the logged data to a remote location.

The set of custom virtual borders may include a main boundary enclosing an area including the current location of the mobile device, a plurality of secondary boundaries, each secondary boundary enclosing an area not including the current location of the mobile device, or both. The operating system is thus instructed to activate the application when the mobile device crosses one or more custom virtual borders (e.g., exit a main boundary, enter or exit a secondary boundary, or both) The main boundary may be generated so that it overlaps each of the generated secondary boundaries, such that the mobile device enters a secondary boundary before exiting the main boundary. The number of boundaries included in the set of custom virtual borders may be selected so that it is less than the maximum number of geofence regions that the mobile device is operable to monitor. At least one main boundary of the custom virtual border set may have a radius of between about 100 meters and about 5 kilometers. At least one of a radius of the main boundary of the custom virtual border set and a distance between a centerpoint of the main boundary and a centerpoint of a secondary boundary may be determined based on the number of secondary boundaries that are generated. At least one secondary boundary of the custom virtual border set may have a radius of between about 100 meters and about 200 meters.

In some examples, the data collected by the application may be the location data. Location data may include geographical coordinates of the mobile device (e.g., latitude, longitude). Location data may further include one or more of an identification of the mobile device, a timestamp associated with the location data, and an indication of either or both horizontal and vertical accuracy of the mobile device's position.

Another aspect of the present disclosure is directed to a computer-readable storage medium of a mobile device having an operating system, an application program, an application program interface, and instructions encoded thereon. The operating system may be configured to cause a processor of the mobile device to control operations of the mobile device. The application program may be configured to cause the processor to collect data when the application program is active. The application program interface may be configured to enable communication between the operating system and the application program. The instructions may cause the processor to receive location data indicating a current location of the mobile device, generate a set of custom virtual borders around the current location of the mobile device; and determine whether the mobile device crosses one or more of the generated custom virtual borders. The operating system may be configured to cause the processor to temporarily activate the application program based on an indication of the mobile device crossing one or more of the generated custom virtual borders.

In some examples, the set of custom virtual borders may be generated only when the application program is activated.

Also, in some examples, the data collected by the application program may be stored on the computer-readable storage medium of the device, and the instructions may be further configured to cause the processor to transmit the stored data to a remote storage medium.

Yet another aspect of the present disclosure is directed to a mobile device including a receiver for receiving location data indicating a current location of the mobile device, a processor for controlling operations of the mobile device, and a computer-readable storage medium. The computer-readable storage medium may have an operating system, an application program, an application program interface, and instructions encoded thereon. The application may be configured to cause the processor to collect data when the application program is active. The application program interface may enable communication between the operating system and the application program. The instructions may be configured to cause the processor to perform any of the methods described in the present application, such as to receive location data indicating a current location of the mobile device, generate a set of custom virtual borders around the current location of the mobile device, and determine whether the mobile device crosses the generated set of custom virtual borders, whereby the operating system is configured to cause the processor to temporarily activate the application program based on an indication of the mobile device crossing one or more of the generated custom virtual borders.

In some examples, the mobile device may further include a transmitter to transmit the stored location data to a remote storage medium. The processor may be further configured to erase the stored location data from the local storage medium after the stored location data is transmitted to the remote storage medium.

Yet a further aspect of the present disclosure is directed to a mobile device including a receiver for receiving location data indicating a current location of the mobile device, a processor for controlling operations of the mobile device, and a computer-readable storage medium having program instructions encoded thereon. The program instructions may be configured to cause the processor to dynamically generate a set of virtual borders around a current location of the mobile device, to detect the mobile device crossing one or more of the dynamically generated virtual borders based on the received location data, and to temporarily enable an application programmed on the mobile device upon detection of the mobile device crossing one or more of the dynamically generated virtual borders. The application program may be activated to collect and store data, and to dynamically generate an updated set of virtual borders around the detected location of the mobile device.

In some examples, the mobile device may further include a transmitter, and wherein the program instructions may be further configured to cause the processor to store location data corresponding to the location of the mobile device when one or more of the dynamically generated virtual borders is crossed, and to transmit the stored location data to a remote location.

An even further aspect of the disclosure is directed to a method for monitoring a location of a mobile device within a region of interest. The method may involve: at a first location of the region of interest, storing a first set of location data, and generating a first custom boundary around the first location; upon detecting the mobile device exiting the first custom boundary, storing a second set of location data, and generating a second custom boundary around the second location; and transmitting the stored sets of location data. The method may be repeatedly performed for any amount of locations within the region of interest, so long as the mobile device remains in the region of interest. In some examples, the region of interest may be a predefined region, such as an area surrounded by a static geofence.

DETAILED DESCRIPTION

The present disclosure takes advantage of an API included with many mobile device operating systems that collects a set of geofences as input and "wakes up" or activates a background application installed on the mobile device when the mobile device crosses the inputted geofence. Specifically, the present disclosure dynamically generates one or more geofences based on a current location of the mobile device, and provides the dynamically generated geofences as the aforesaid input. In this manner, while the operating system still controls when the background application is woken up to collect data, the dynamically generated geofences may be used to influence how often the background application is woken up. Thus, dynamically generating geofences restores at least some control over data collection to the background application.

Data collected by an application may be valuable to the developer of the application or to another third party. In the case of location data, the data may indicate user interests in a given region of interest, such as a store or city, depending on the locations that the mobile device is identified as having visited. Over time, location data of a given mobile device may be logged or otherwise collectively stored, further indicating patterns of the mobile device user (e.g., the user regularly visiting a given second location after a given first location, the user visiting a third given location more often than either the first or second given locations, etc.) Furthermore, if location data is collected from multiple mobile devices, the data from those devices may be further aggregated, such as to identify public trends or interests, or to identify traffic patterns of multiple users through certain locations or areas. The present disclosure provides systems, devices and methods that can potentially increase the amount of location data that can be collected, thereby increasing the robustness of the data sets, and improving the quality of analysis based on the data. This, in turn, increases not only the quantity but also the value of the collected location data.

Figure 1:
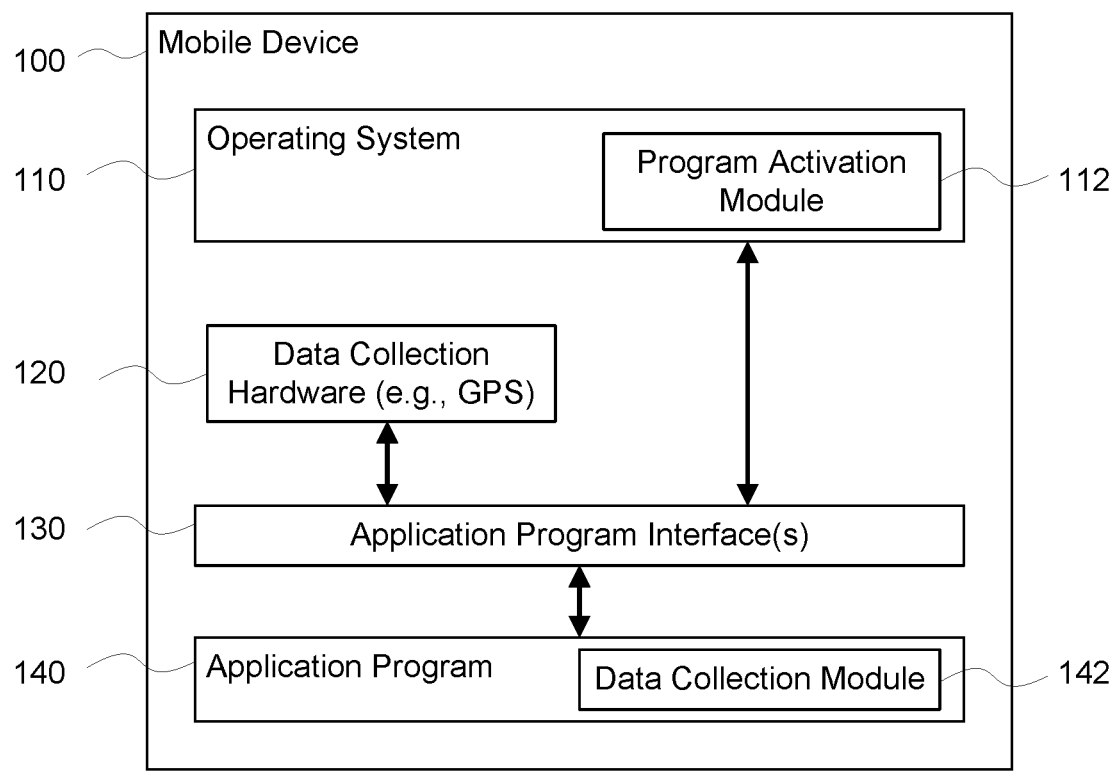
FIG. 1 is a block diagram of a mobile device according to the prior art.
Figure 2:
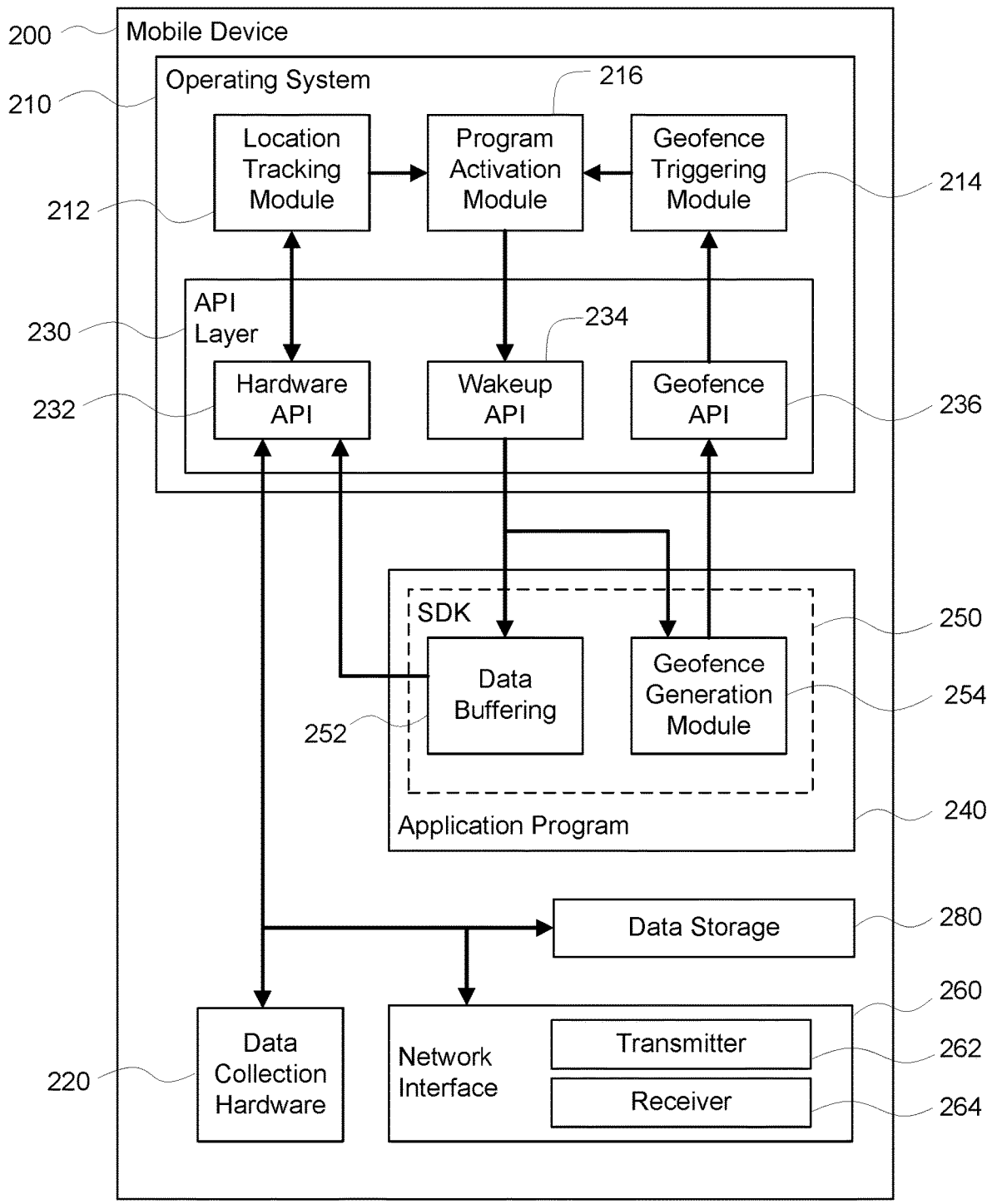
FIG. 2 is a block diagram of a system for monitoring a location of a mobile device according to the prior art.

FIG. 2 is a block diagram showing an example configuration of a mobile device 200, such as a smartphone, in accordance with the present disclosure. The mobile device 200 is programmed with an operating system (OS) 210 that causes a processor of the mobile device to control various operations of the mobile device. Included in the operating system is an API layer 230, which includes modules for interfacing the operating system with the mobile device hardware (e.g., sensors or other data collection hardware 220, network interface 260, data storage 280, etc.) and with software application programs stored on the mobile device. The API layer 230 enables communication among these hardware and software components of the mobile device. Also programmed on the mobile device 200 is an application program or app 240. The app 240 may include code for performing various functions generally known to those skilled the art, including data collection.

The example configuration of FIG. 2 leverages a location tracking module 212, a geofence triggering module 214, and a program activation module 216 included in the OS 210 in order to control how frequently the app 240, if operating in the background of the mobile device 200, is temporarily activated to collect data. The location tracking module 212 is programmed to track the location of the mobile device using the device's data collection hardware 220. The location tracking module 212 interfaces with the data collection hardware 220 via hardware API 232. The OS 210 retains full control over the location tracking module 212. Therefore, even though the location of the mobile device may be regularly tracked by the OS 210, the OS does not necessarily permit for storage (e.g., access/read) of the tracked location, or for the app 240 to collect additional information, or even for the app 240 to access the tracked location information. Thus, it is still necessary to activate the app 240 in order to collect and store data, including data indicating the location of the mobile device.

The geofence triggering module 214 is programmed to receive a geofence indicating a condition under which the app 240 may be activated (e.g., the mobile device entering or exiting the geofence). In the present disclosure, a "geofence" may refer to any border defining a geographical separation between two physical spaces (e.g., a line running north to south 100 meters west of the mobile device 200) or any boundary defining a geographical area of physical space (e.g., an area within a 100 meter radius of the mobile device 200). The program activation module 216 compares the mobile device location provided by the location tracking module 212 to the condition indicated by the geofence triggering module 214 in order to determine whether the condition has or has not been met. When the condition is met, the program activation module 216 activates the app 240 via a wakeup API 234.

Activation of the app 240 initiates both a data buffering module 252 and a geofence generation module 254 included in the app 240. The modules may be included with the app 240 as part of a software development kit (SDK) 250. The data buffering module 252 is responsible for instructing the data collection hardware 220, via hardware API 232, to collect data, and for instructing the data storage 280 of the mobile device, also via hardware API 232, to store the collected data. The geofence generation module 254 is responsible for dynamically generating a new geofence based on the location of the mobile device 200 when the app 240 is activated. The new geofence is then provided, via a geofence API 236 included in the OS API layer 230, as input to the geofence triggering module 214. The geofence triggering module 214 replaces the previous geofence with the new geofence, and the above described protocol repeats itself with the program activation module determining whether to activate the app 240 using the new condition prescribed by the newly received geofence.

The app 240 is also responsible for instructing the transmitter 262 of the network interface 260 (which includes both the transmitter and a receiver 264), via the hardware API 232, to transmit the collected and stored data to a remote location. In this regard, the data storage 280 may be a buffer providing temporary storage of the data until the data is transmitted out to a remote location for more permanent storage and further evaluation.

Each time the app 240 is activated, the data collection hardware 220 collects data, and stores the data in the data storage 280. Over time, the collected data builds up in the data storage 280, and it is necessary to clear the data storage 280 in order to collect more data. The data buffering module 252, or another module, may be responsible for determining whether to clear the data from the data storage 280. One or more criteria may be used to determine whether to clear the data, such as passage of time (e.g., clear data every hour, etc.) the amount of data currently stored, or the amount of storage remaining.

In the example of FIG. 2, the SDK 250 is shown as being part of the app 240. However, in other examples, the SDK 250 may be independently programmed onto the mobile device, and may operate independently from the app 240. For instance, in many cases, a mobile device may be programmed with several apps having location tracking features. The above-described SDK may be installed once for the mobile device, but utilized for each of the several apps with location tracking features. In this regard, each or any of the apps may be activated upon a geofence condition being met, and data may be collected and stored by each app. Any of the apps may then, upon activation, call the SDK so that the SDK generates a new geofence. Either the app, or the called SDK, may then control storage and transmission of the collected data. In yet further examples, the SDK may be initially programmed onto the mobile device by the mobile phone manufacturer or provider, and may even be integrated with the OS. Those skilled in the art will recognize that the principles of the present application are applicable to mobile devices having the tools of the SDK described herein, regardless of how or when those tools are programmed onto the mobile device.

The systems and devices described above may be operated using the example routines described herein. It should be understood that the operations of the following routines do not have to be performed in the precise order described below. Rather, various operations can be handled in a different order, or simultaneously. Moreover, operations may be added or omitted.

Figure 3:
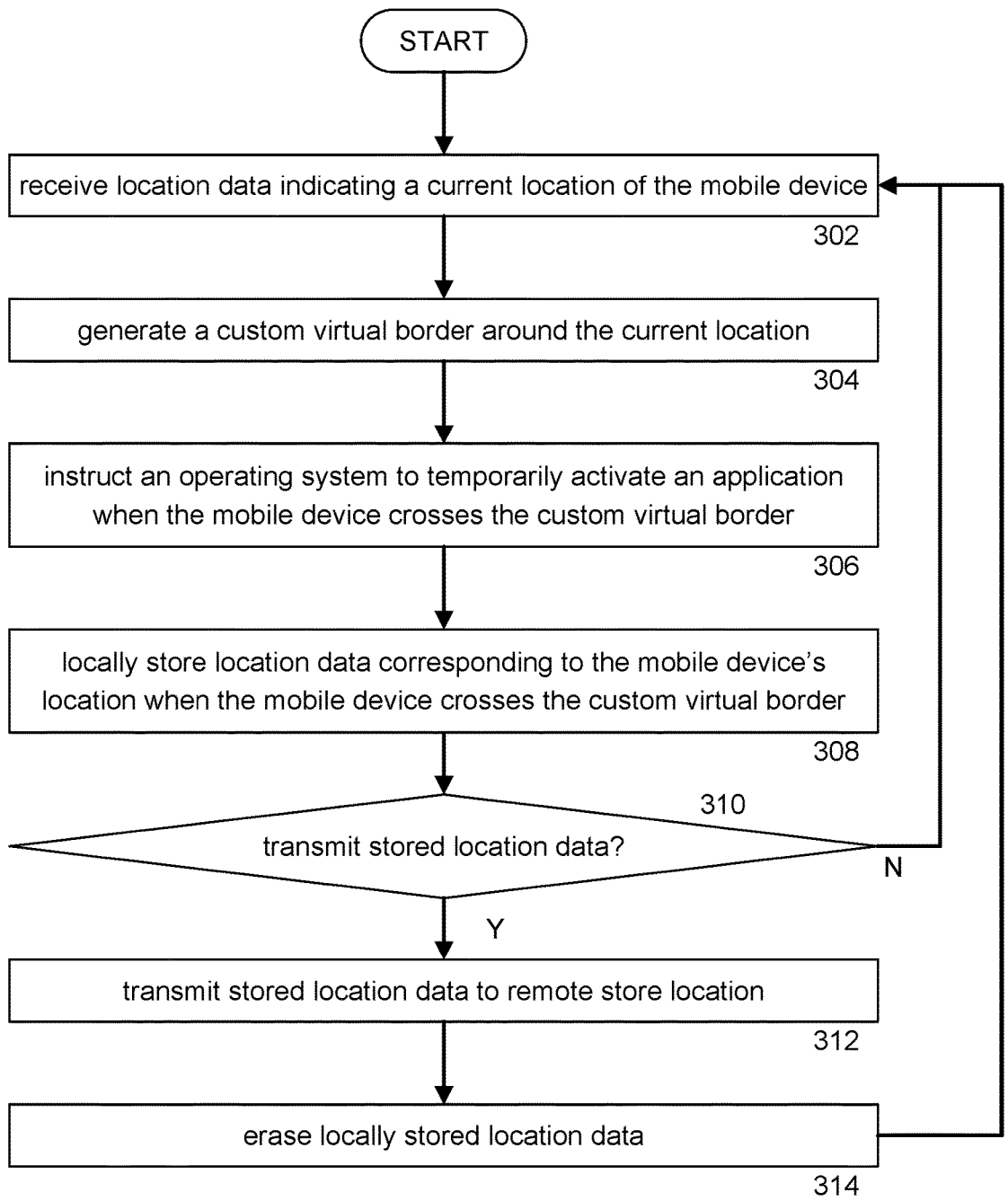
FIG. 3 is a block diagram of a mobile device in accordance with an aspect of the disclosure.

FIG. 3 is a flow diagram showing an example data collection routine 300 executed by a mobile device using a set of dynamically generated geofences, also referred to more generally herein as custom virtual borders. It should be noted the data that is logged or otherwise stored by the application program in the example of routine 300 is location data. Nonetheless, as mentioned above, the present disclosure is not limited to logging and storage of location data but provides for any other data collection enabled by the mobile device hardware (or a connected hardware module).

At 302, the mobile device receives location data indicating a current location of the mobile device. If the app has been activated or is running in the foreground of the mobile device, operations may continue at 304, in which the mobile device generates a set of custom virtual borders (e.g., geofences) around its current location, as indicated in the received location data. As described below, the virtual border set may include a boundary encompassing the current location, a plurality of boundaries each of which is in the vicinity of the current location but not encompassing the current location, or both.

At 306, the mobile device instructs the operating system to activate an app programmed on the mobile device when the mobile device crosses one or more of the custom virtual borders. The instruction may be provided by the SDK, and may include providing the set of custom virtual borders as an input to the OS. For instance, the OS may receive the set of custom virtual borders and may determine based on a tracked location of the device when a border is crossed.

At 308, the mobile device locally stores the received location data. The data stored at a given instant may be thought of as a data point, with several data points being collected and stored over a span of time. The location data may comprise several parameters, including but not limited to an identification of the mobile device, a timestamp of the collected data point, a position of the mobile device, and an accuracy of the mobile device's position. The position parameters may include each of separate latitude and longitude components. The accuracy parameter may include each of a horizontal accuracy component and a vertical (e.g., altitude) accuracy component.

At 310, the mobile device determines whether to transmit the locally stored location data to a remote location. If a predetermined amount of time (e.g., 1 hour) has passed since the previous transmission of stored data, if the amount of data currently stored reaches a threshold amount, or if the amount of available storage drops below a threshold amount, or any combination of these factors, the mobile device may determine to transmit the stored location data. At 312, the mobile device instructs the transmitter to transmit the stored location data to a remote store location, such as a remote server, for more permanent storage and, optionally, for further analysis of the data. Further analysis of the data may involve aggregation of the data with collected data from other mobile devices. Optionally, at 314, the locally stored copy of the transmitted data is erased in order to make space for future data collection operations.

In the example routine 300 of FIG. 3, the determination whether to transmit the stored location data and erase the locally stored data is made every time location data is locally stored. In other examples, this determination is made independently, such as after the passage of a predetermined amount of time (e.g., 1 hour) regardless of whether or not the app has been activated. In yet further examples, data may be transmitted every time a virtual border is crossed. In such example, the data may be temporarily buffered for transmission without requiring further storage.

Upon collection and local storage of location data, the routine 300 may be repeated in order to collect and store more location data at a later time. Thus, operations may loop back to at 304, with the mobile device again generating a set of custom virtual borders, this time around the newly (e.g., most recent) determined location of the mobile device. Then, when the mobile device crosses the new set of custom virtual borders, the mobile device may again instruct the operating system to temporarily activate the app and locally store its then-current location.

Figure 6:
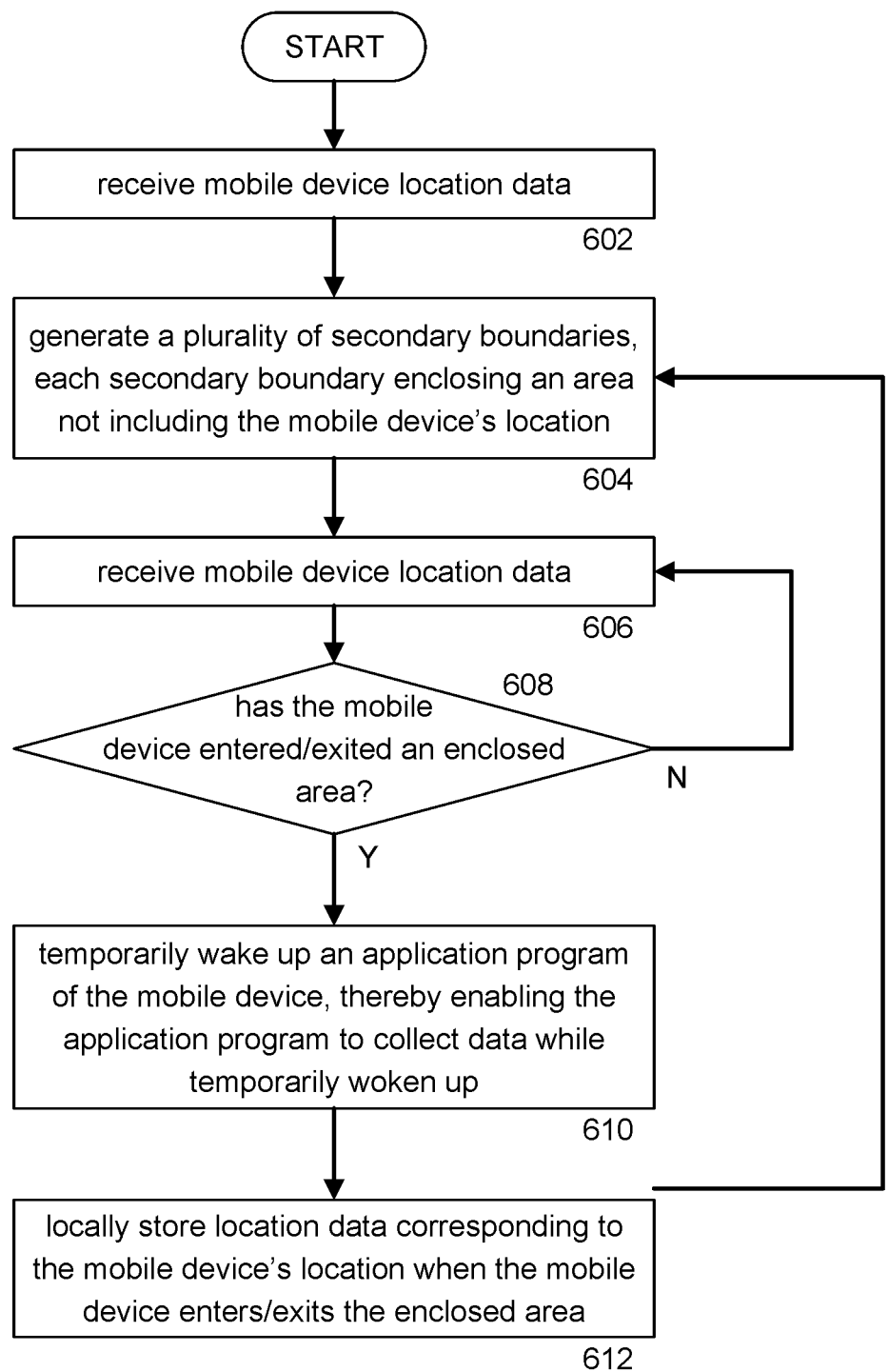
FIG. 6 is a flow diagram of a second example dynamic geofencing methodology in accordance with an aspect of the disclosure.
Figure 8:
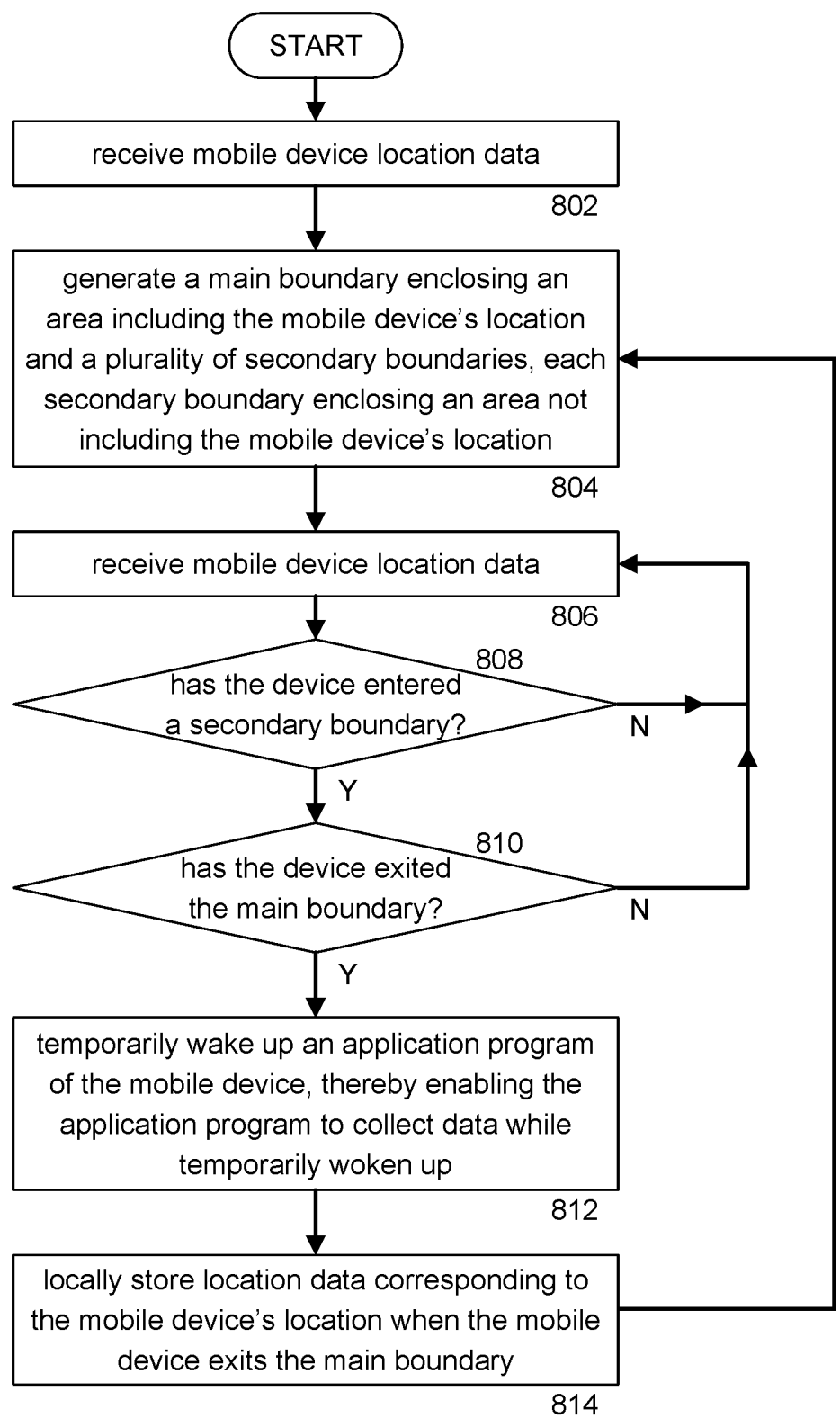
FIG. 8 is a flow diagram of a third example dynamic geofencing methodology in accordance with an aspect of the disclosure.

The example routine 300 of FIG. 3 generally describes a set of virtual custom borders as being "around" the mobile device, but does not more specifically identify the position of the set of virtual custom borders in relation to the mobile device. The following routines of FIGS. 4, 6 and 8 provide more specific examples of virtual custom border sets (e.g., main boundaries, secondary boundaries), each of which is selected to encompass an area that either includes or specifically does not include the location of the mobile device.

Figure 4:
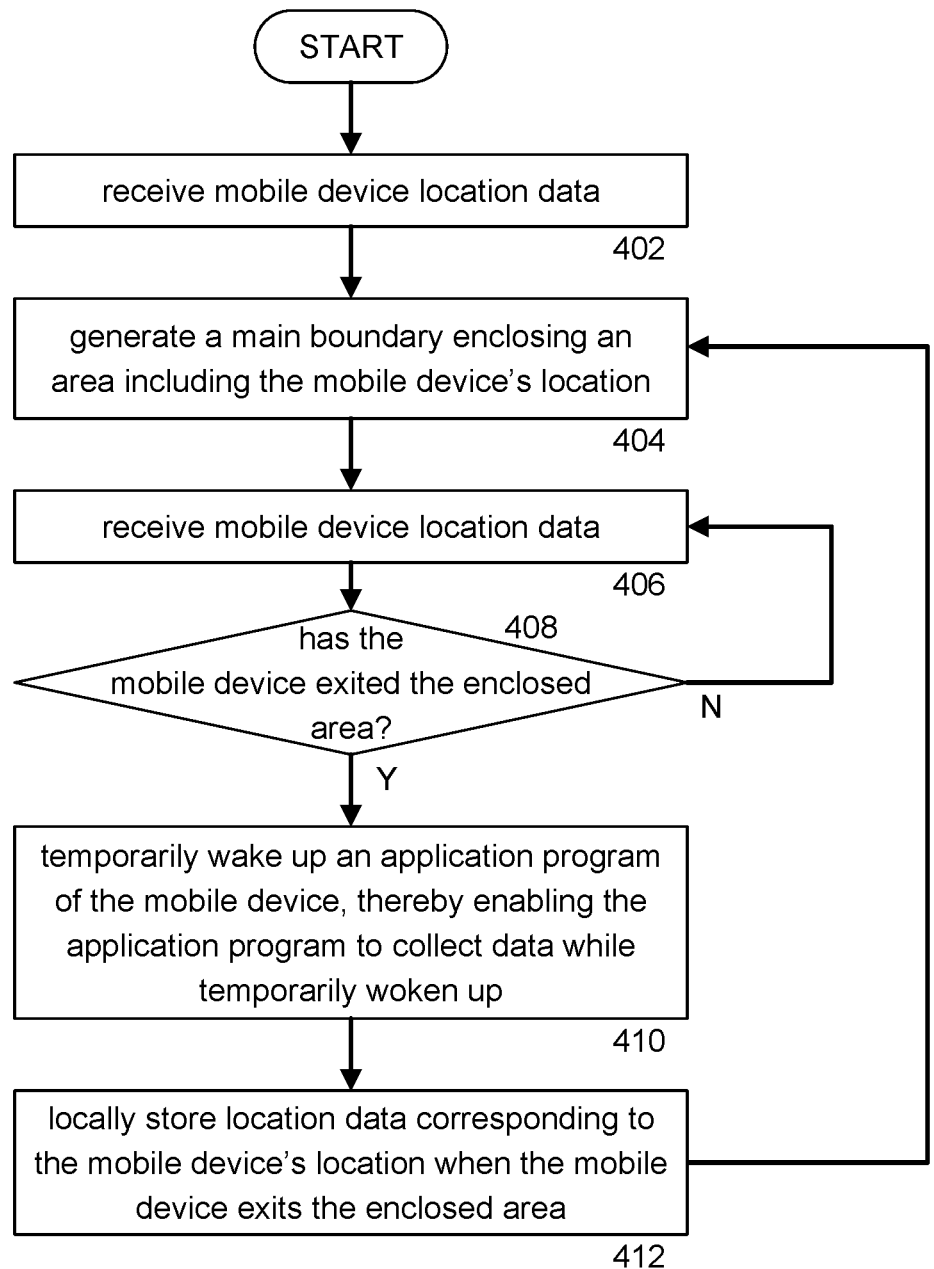
FIG. 4 is a flow diagram of a first example dynamic geofencing methodology in accordance with an aspect of the disclosure.

FIG. 4 is a flow diagram showing an example dynamic geofencing routine 400 for a mobile device in accordance with an aspect of the present disclosure. The steps of the routine 400 are further visually illustrated by the diagrams in FIGS. 5A-5E, as described herein. To the extent that the illustrations of FIGS. 5A-5E clarify the operations of routine 400, those illustrations are described in connection with the description of FIG. 4.

Figure 5A:
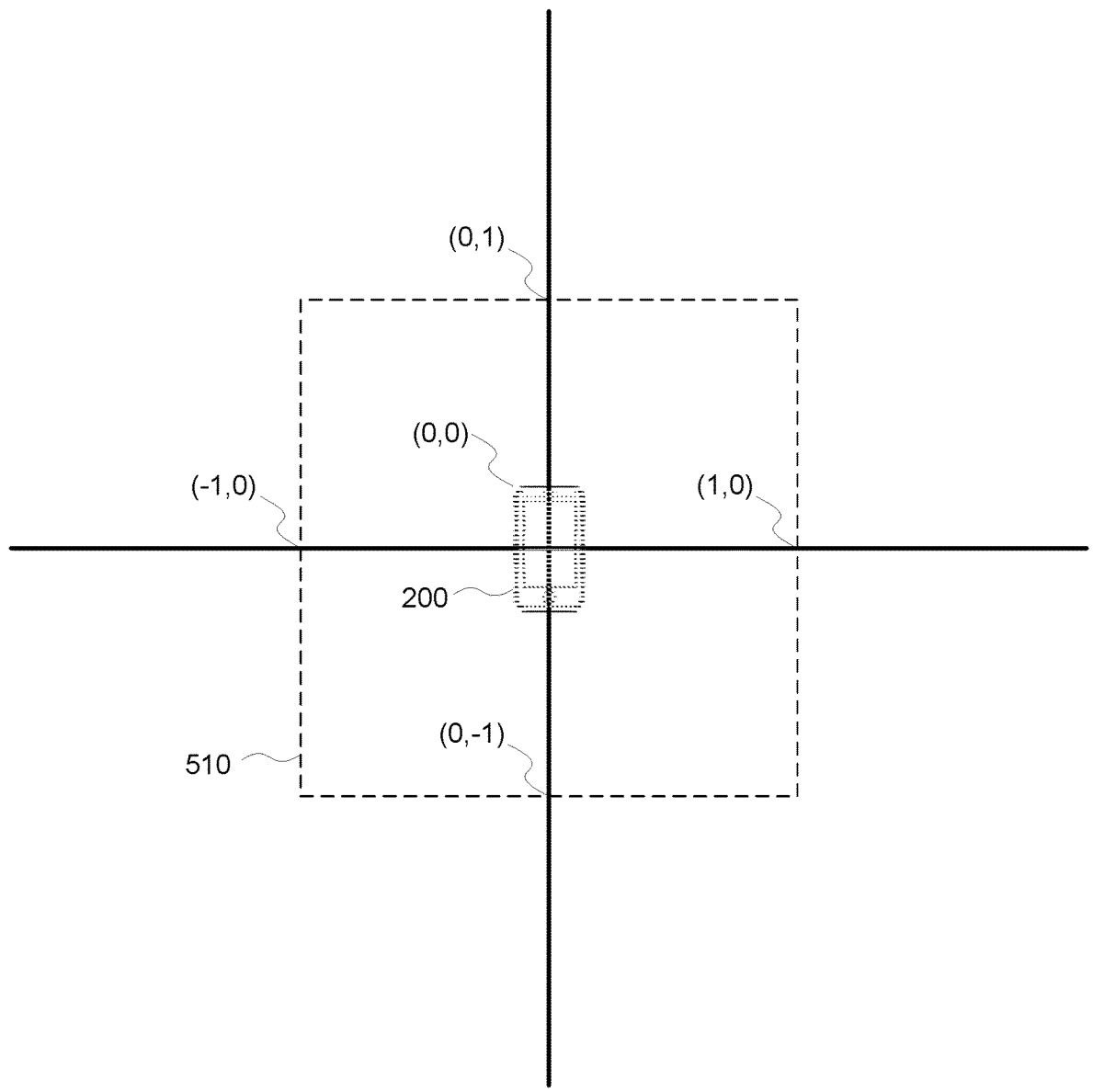
FIGS. 5A-5E is a visual representation of the first example dynamic geofencing methodology of FIG. 4.

At 402, the mobile device receives mobile device location data indicating a current location of the mobile device. In FIG. 5A, this location is denoted as (0,0), the location of mobile device 200.

At 404, the mobile device generates a main boundary enclosing an area including the mobile device's location. FIG. 5A shows a square-shaped main boundary 510 having borders at (−1,0), (0,1), (1,0) and (0,−1), whereby the (0,0) location of the mobile device 200 is enclosed by the main boundary 510. While the main boundary shown in FIG. 5A is a square, those skilled in the art will recognize that the main boundary may be a closed boundary of any shape (e.g., circle, rectangle, oval, polygon, etc.)

Over time, the mobile device user moves, thus changing the location of the mobile device. As the mobile device changes location, at 406, the mobile device continues to receive mobile device location data.

At 408, the mobile device determines based on the newly received location data whether it has exited the enclosed area. The enclosed area is surrounded by a border (the dotted line of boundary 510 in FIG. 5A). For two consecutively collected locations of the mobile phone, if one location is on one side of the border and the other location is one the other side of the border, it may be determined that the mobile device has crossed the border. Thus, if the enclosed area encloses the original location of the mobile device, and it is determined that the mobile device crosses the border of the enclosed area, by extension it is determined that the mobile device has exited the enclosed area. Other methods of detecting geofence crossings are known in the art, and are similarly applicable to the present disclosure.

If it is determined that the mobile device has not yet exited the enclosed area (e.g., the current location of the mobile device is on the same side of the border as the previously received location), operations resume at 406, and the mobile device continues to receive location data until it is determined that the mobile device has exited the enclosed area.

Figure 5B:
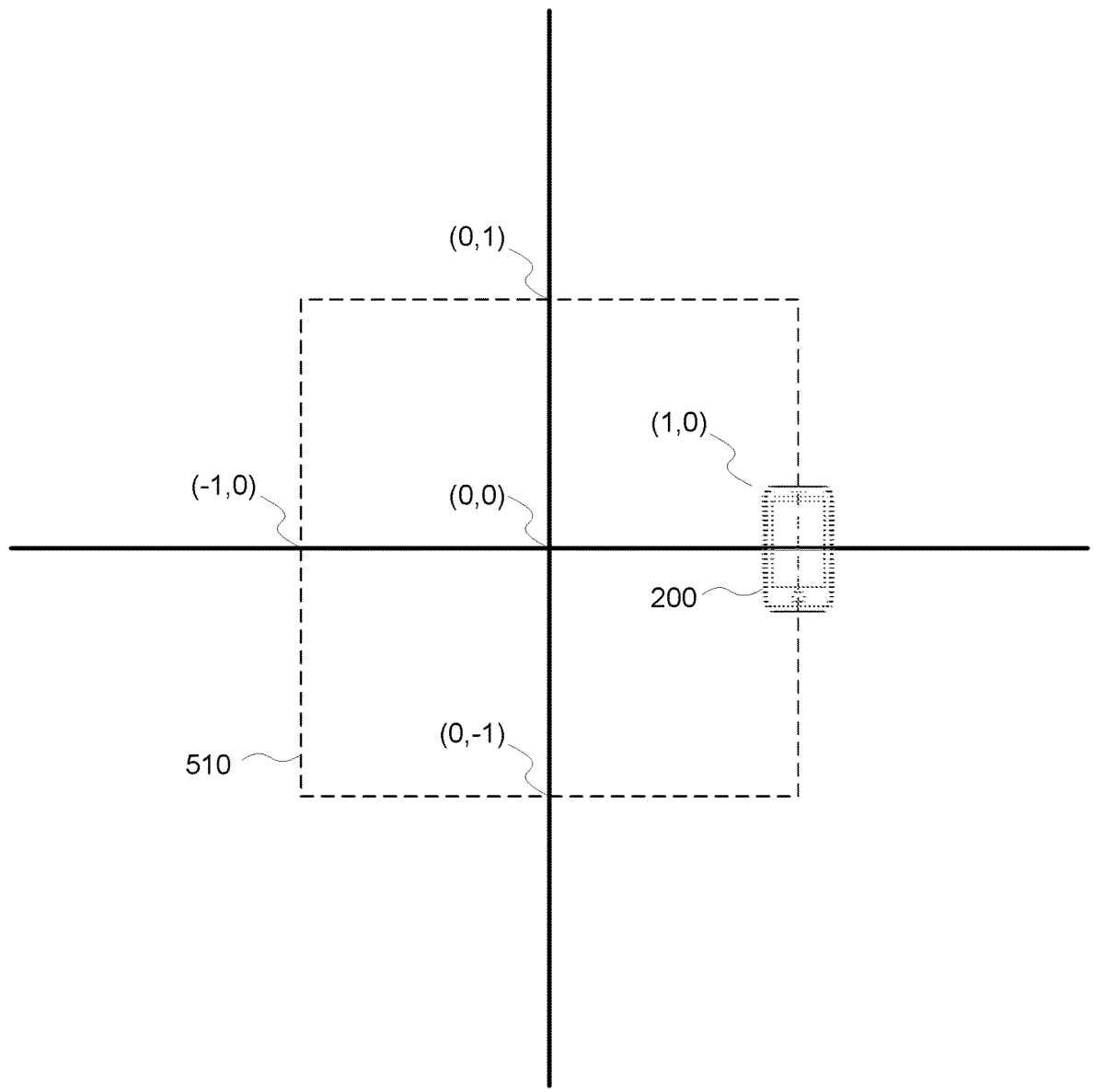

FIG. 5B shows the mobile device at location (1,0), crossing the border of the enclosed area 510. Upon this crossing, it may be determined that the mobile device has exited the enclosed area. Based on this determination, at 410, the mobile device temporarily wakes up an application program. Waking up the application program enables the application program to collect location data, indicating the location of the mobile device when the mobile device exits the enclosed area (e.g., in the example of FIG. 5B, location (1,0)). At 412, the collected location data is locally stored at the mobile device.

Figure 5C:
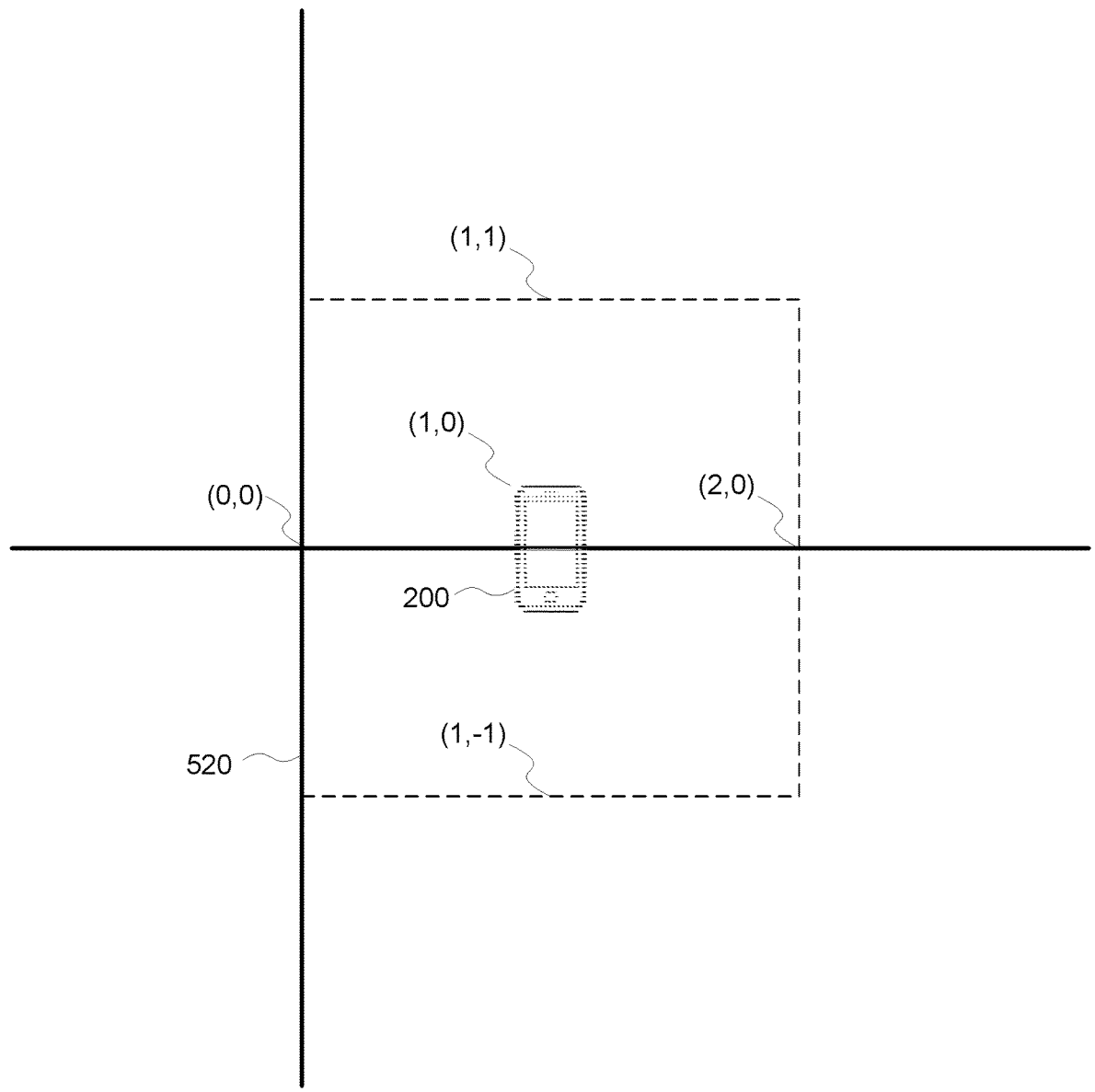

The routine 400 then repeats with generation of a new enclosed area at 404. FIG. 5C shows a new main boundary 520 enclosing the current location (1,0) of the mobile device 200. In the example of FIG. 5C, the newly generated main boundary 520 is centered at the mobile device 200 and is the same size and shape as the previously generated main boundary 510, although in other examples each generated enclosed area may be a different size and shape depending on various factors (e.g., recent speed of the mobile device, recent direction of travel of the mobile device, previous locations of the mobile device, etc.). Thus, the main boundary 520 is square-shaped and has borders at (0,0), (1,1), (2,0) and (1,−1).

Figure 5D:
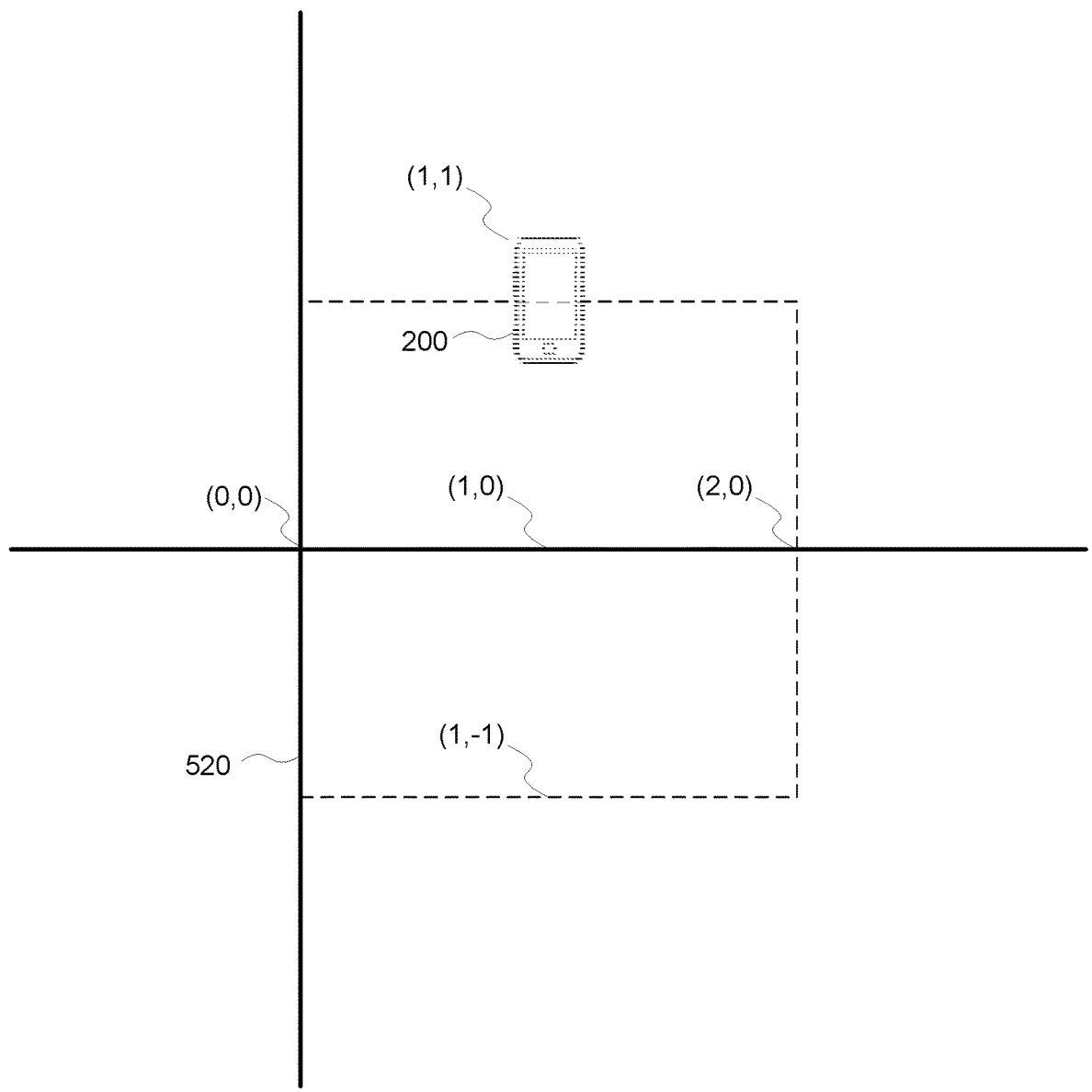
Figure 5E:
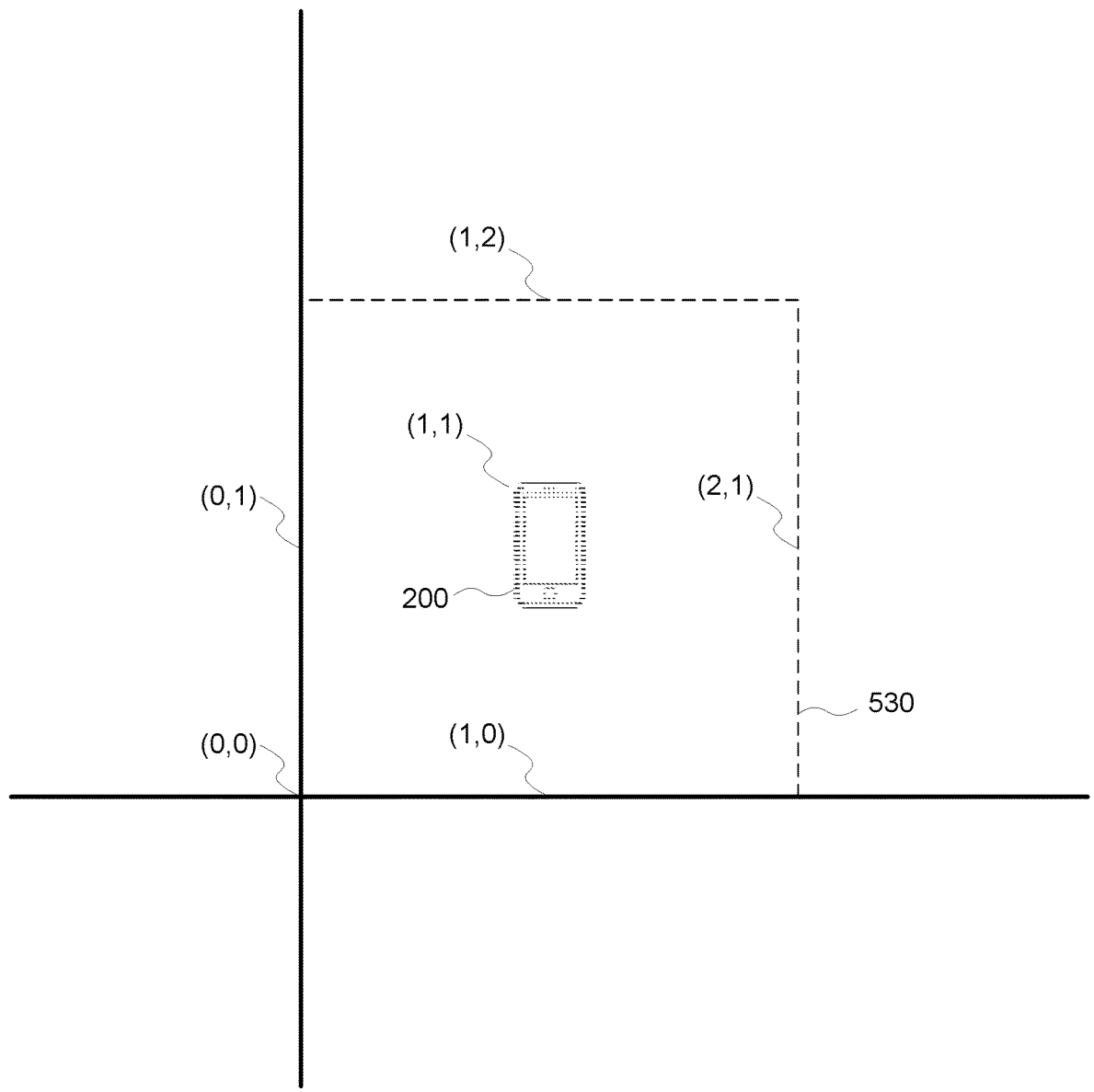

As a further illustration of the routine 400 of FIG. 4 repeating, FIG. 5D shows the mobile device 200 changing direction and moving from location (1,0) to location (1,1). When the mobile device reaches location (1,1), it crossed the newly generated main boundary 520, which again triggers generation of yet another main boundary, shown in FIG. 5E as new main boundary 530. Main boundary 530 is shown as a square centered at the new location (1,1) of the mobile device and having borders at (0,0), (1,1), (2,0) and (1,−1). In this manner, the mobile device may repeatedly dynamically generate new boundaries, whereby every time the mobile device is detected as exiting a boundary, an application installed on the mobile device is temporarily woken up to collect and store data.

FIG. 6 is another flow diagram showing an alternative example dynamic geofencing routine 600 for a mobile device in accordance with another aspect of the disclosure. The steps of the routine 600 are further visually illustrated by the diagrams in FIGS. 7A-7E, as described herein. Many aspects of the routine 600 are comparable to those of the previously described routine 400. To the extent that certain aspects of the routine 600 are or may be different, those differences are described below.

Figure 7A:
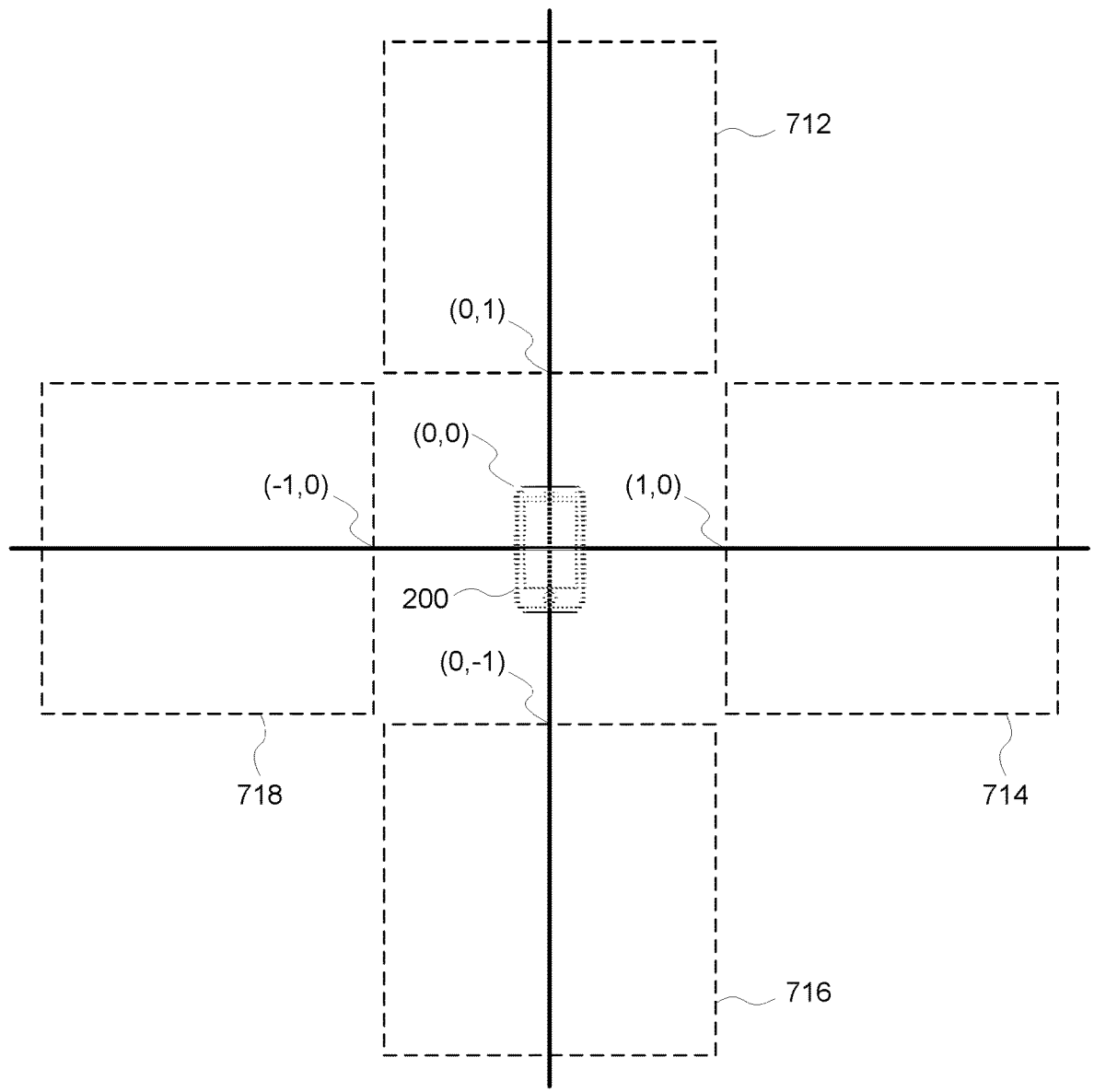
FIGS. 7A-7E is a visual representation of the second example dynamic geofencing methodology of FIG. 6.

At 602, the mobile device receives mobile device location data indicating a current location of the mobile device. In FIG. 7A, this location is (0,0).

At 604, the mobile device generates a plurality of secondary boundaries. Each secondary boundary encloses an area that does not include the location of the mobile device. For instance, FIG. 7A shows four secondary boundaries 712, 714, 716 and 718. Each of those boundaries encloses a square shaped area. The bottom border of secondary boundary 712 touches (0,1), the left border of secondary boundary 714 touches (1,0), the top border of secondary boundary 716 touches (0,−1), and the right border of secondary boundary 718 touches (−1,0). The aforementioned borders effectively form an enclosed area of their own, comparable to the main boundary of FIG. 5A. In other words, the mobile device 200 is enclosed within the combined borders of the secondary boundaries, but not enclosed within any given one of the secondary boundaries.

In the example of FIG. 7A, four secondary boundaries are generated. In other examples, a different number of secondary boundaries may be generated. The total number of boundaries generated by the SDK may be selected based on a default value, or based on input received from a remote server. Furthermore, the total number of boundaries is preferably selected to be less than the maximum number of boundaries that the mobile device OS is capable of monitoring, thereby leaving the OS free to perform other operations. For instance, the OS may include a preset limit for each application programmed on the mobile device, and may instruct the SDK to limit the number of boundaries based on the preset limit.

Like the main boundaries described above, the secondary boundaries may be any shape and size. Also, it is generally preferable, although not required, that the borders of the secondary boundaries tangent or overlap one another such that the mobile device must cross a border of at least one secondary boundary.

At 606, as the mobile device changes its location over time, it continues to receive mobile device location data. At 608, the mobile device determines based on the newly received location data whether it has entered the enclosed area of a secondary boundary (e.g., crossed a border of the secondary boundary). If it is determined that the mobile device has not yet entered the enclosed area, operations resume at 606, and the mobile device continues to receive location data.

Figure 7B:
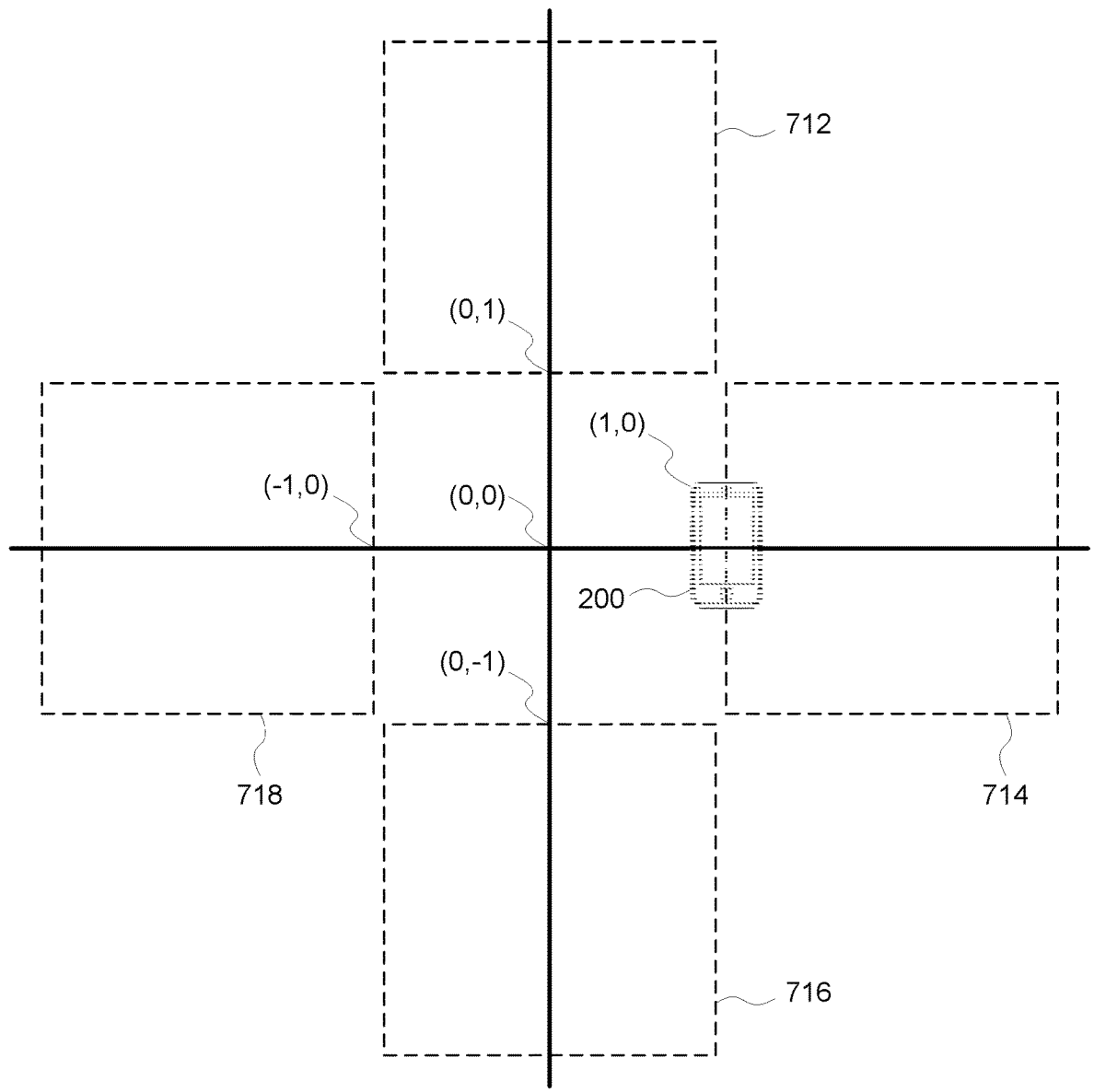

In the example of FIG. 7B, the mobile device 200 is shown entering into secondary boundary 714 at location (1,0). Upon this entering, the mobile device determines that it has entered the enclosed area 714 and, at 610, temporarily wakes up an application program, thereby enabling the application program to collect location data indicating the mobile device's location when the mobile device enters the enclosed area (e.g., in the example of FIG. 7B, location (1,0)). At 612, the collected location data is locally stored at the mobile device.

Figure 7C:
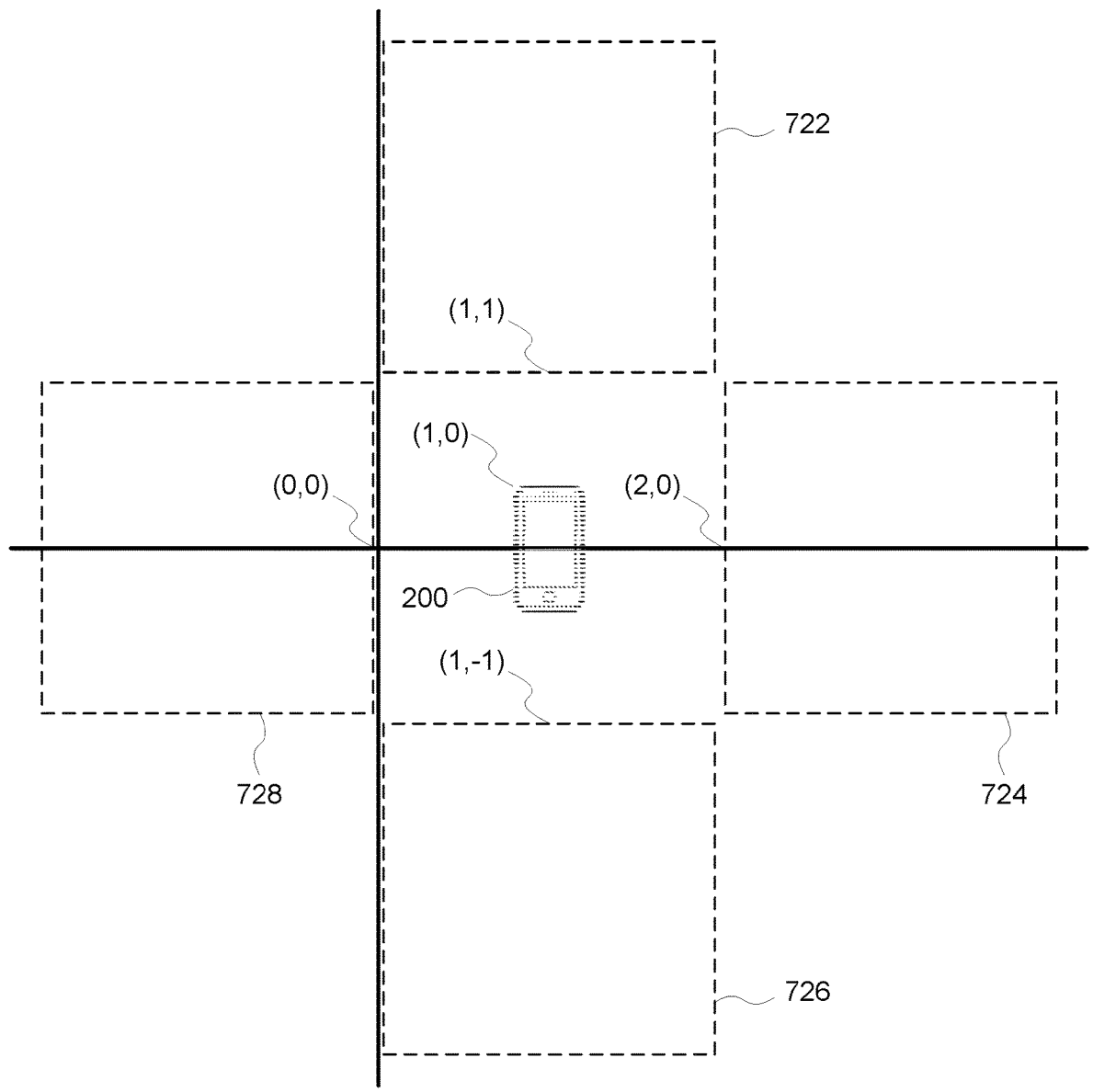

The routine 600 then repeats with generation of a new plurality of secondary boundaries, at 604. FIG. 7C shows a new plurality of secondary boundaries 722, 724, 726 and 728 around the current location (1,0) of the mobile device 200. In the example of FIG. 7C, each of those boundaries encloses a square shaped area, the bottom border of secondary boundary 722 touches (1,1), the left border of secondary boundary 724 touches (2,0), the top border of secondary boundary 726 touches (1,−1), and the right border of secondary boundary 728 touches (0,0). As with the first plurality of secondary boundaries, each of the new secondary boundaries does not enclose the location of mobile device 200, but the secondary boundaries are arranged to surround the mobile device 200 such that when the mobile device continues to move, it will cross a border of at least one of the secondary boundaries.

Figure 7D:
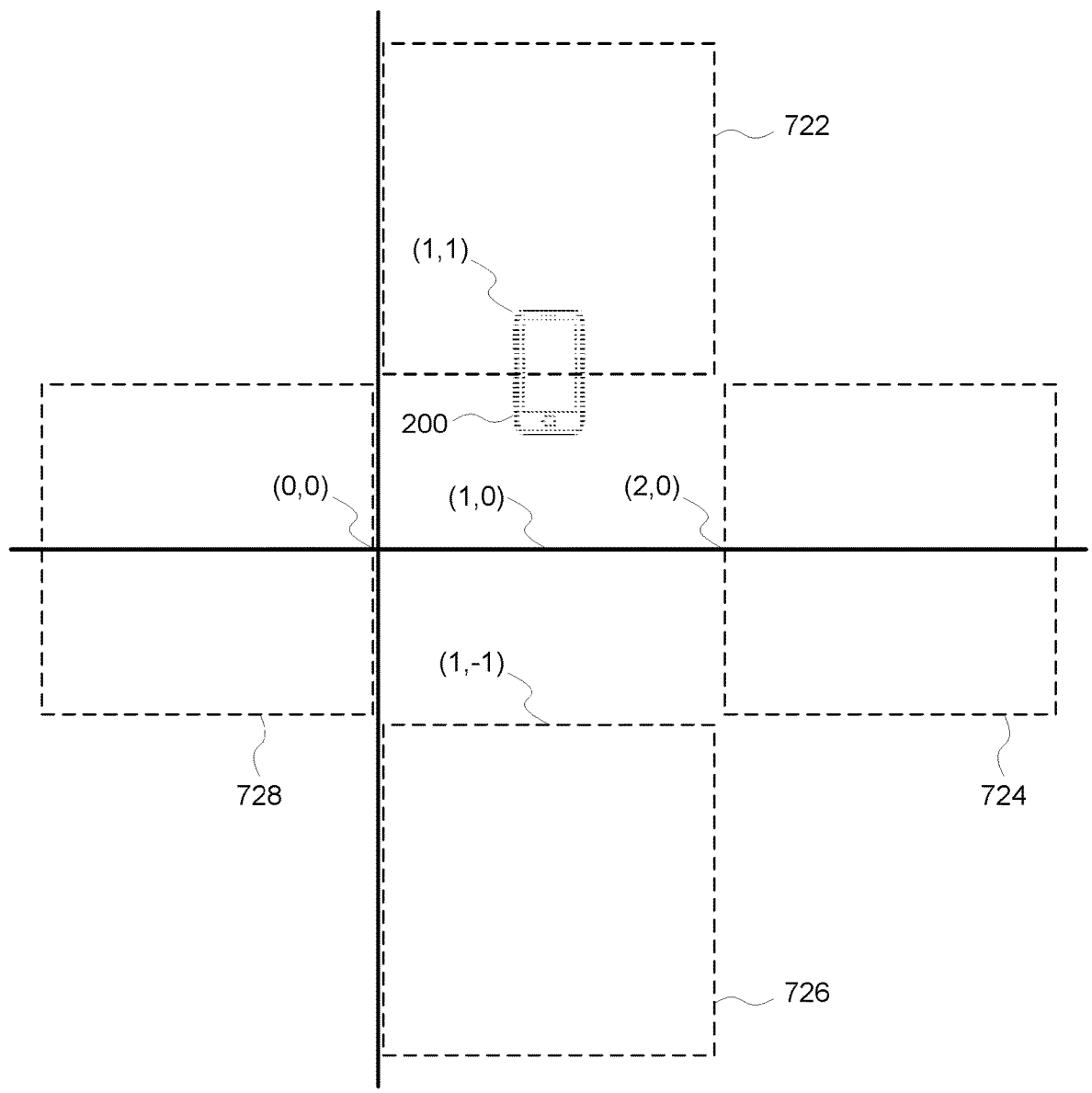
Figure 7E:
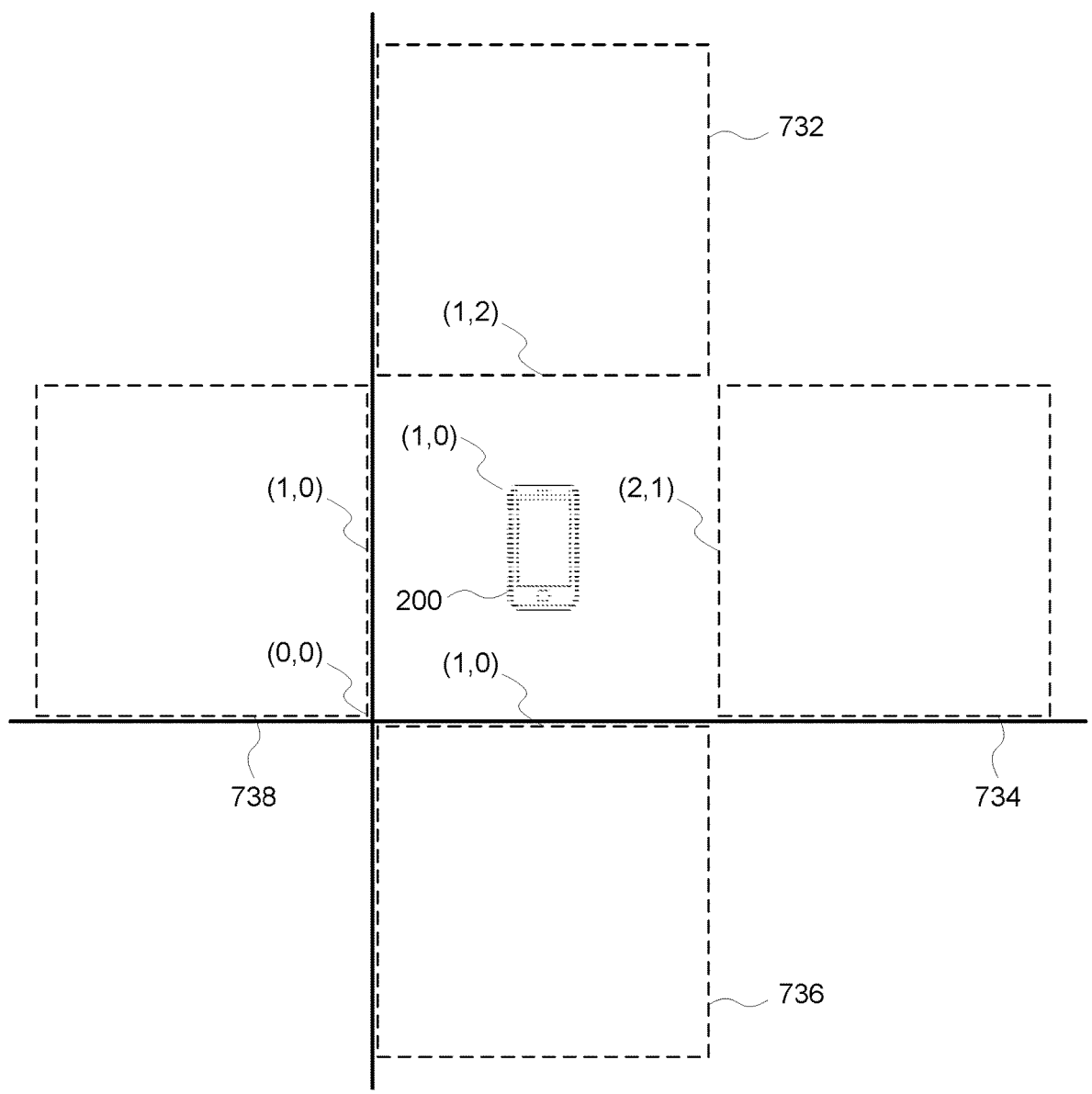

As a further illustration of the routine 600 of FIG. 6 repeating, FIG. 7D shows the mobile device 200 changing direction and moving from location (1,0) to location (1,1). When the mobile device reaches location (1,1), it enters into one of the newly generated secondary boundaries, secondary boundary 722. Entering the secondary boundary 722 triggers generation of yet another plurality of secondary boundaries, shown in FIG. 5E as secondary boundaries 732, 734, 736, and 738. In the example of FIG. 7E, each of those boundaries encloses a square shaped area, the bottom border of secondary boundary 732 touches (1,2), the left border of secondary boundary 734 touches (2,1), the top border of secondary boundary 736 touches (1,0), and the right border of secondary boundary 738 touches (0,1). In this manner, the mobile device may repeatedly dynamically generate new secondary boundaries, whereby every time the mobile device is detected as entering a secondary boundary, an application installed on the mobile device may be woken up to collect and store data.

In the above examples of FIGS. 6 and 7A-7E, the condition by which the application program is woken up, and a new plurality of boundaries are generated, is the mobile device's entry into a secondary boundary. However, in some situations, the events that cause the application program to be woken up may be received by the OS in an unexpected order. For example, it is possible that the mobile device is moving so fast that it enters into a secondary boundary before the mobile begins to detect entry into the secondary boundary. In such a situation, the mobile device will only begin searching for entry into the secondary boundary after the mobile device has entered. To avoid such a problem, the OS may be programmed with multiple conditions or events, any of which may prompt the OS to wake up the application program. For instance, continuing with the above example of the fast moving mobile device, the OS may wake up the application program when the mobile device is detected either entering or exiting (or more generally, crossing) the secondary boundary. The OS may simply determine whether the mobile device crosses the secondary boundary, such as if one received location of the mobile device is inside the secondary boundary and a subsequently received location of the mobile device is outside the secondary boundary, or vice versa. Methods of detecting geofence crossings, and particularly entering or exiting a geofence, are known in the art and generally applicable to the examples herein.

If this alternative condition (exiting a secondary boundary, rather than entering) were hypothetically applied to the example of FIGS. 7A-7E, then when the mobile device 200 would move from location (0,0) to location (1,0) (as shown in FIG. 7B), the mobile device's entry to secondary boundary 714 would not result in the application program being woken up or a new plurality of boundaries being generated. Later, when the mobile device moves from location (1,0) to location (1,1) (as shown in FIG. 7D), the mobile device would detect that it is exiting the secondary boundary 714 (since location (1,1) is also on a border of the secondary boundary 714). Therefore, the mobile device 200 moving to location (1,1) would result in the application program being woken up and a new plurality of secondary boundaries (such as those shown in FIG. 7E) being generated around the location (1,1) of the mobile device.

As yet a further alternative to the above-described routines 400 and 600, FIG. 8 is a flow diagram showing an example dynamic geofencing routine 800 for a mobile device in which both a primary geofence and a plurality of secondary geofences are generated. The steps of the routine 800 are further visually illustrated by the diagrams in FIGS. 9A-9D, as described herein. Many aspects of the routine 800 are comparable to those of the previously described routines 400 and 600. To the extent that certain aspects of the routine 800 are or may be different, those differences are described below.

Figure 9A:
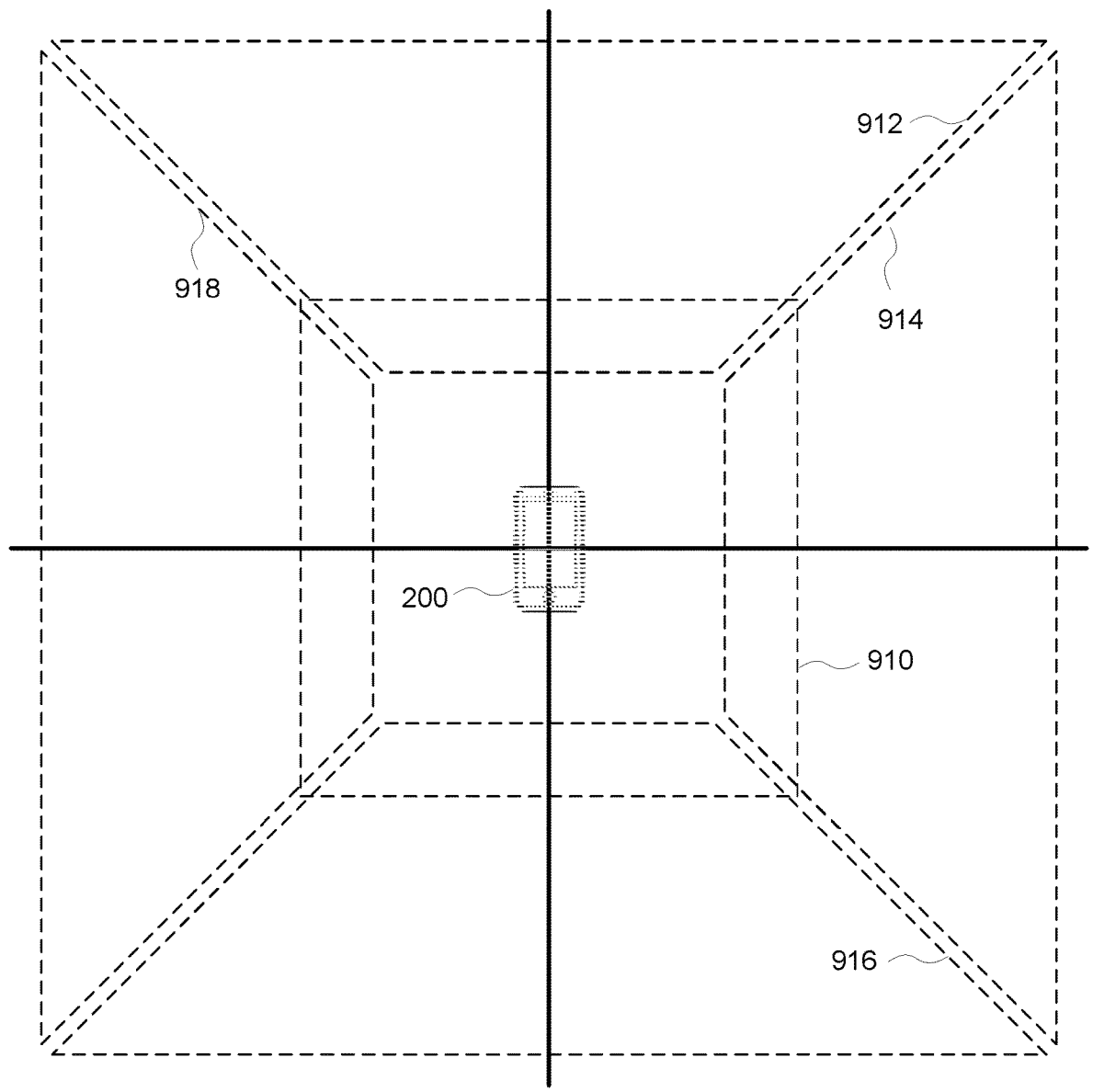
FIGS. 9A-9D is a visual representation of the third example dynamic geofencing methodology of FIG. 8.

At 802, the mobile device receives mobile device location data indicating a current location of the mobile device. At 804, the mobile device generates both a main boundary and a plurality of secondary boundaries. The main boundary encloses an area including the location of the mobile device. Each secondary boundary encloses an area that does not include the location of the mobile device. For instance, FIG. 9A shows a main boundary 910 and four secondary boundaries 912, 914, 916 and 918. The main boundary is a square centered at the location of the mobile device 200. Each of the secondary boundaries is a trapezoid offset so as not to enclose the location of the mobile device 200. Each secondary boundary 912, 914, 916 and 918 is arranged such that it partially overlaps a portion of the main boundary 910. In this manner, the secondary boundaries 912, 914, 916 and 918 are arranged in a manner such that the mobile phone 200 must enter at least one of the secondary boundaries before exiting the main boundary 910.

At 806, as the mobile device changes its location over time, it continues to receive mobile device location data. At 808, the mobile device determines whether it has entered the enclosed area of a secondary boundary (e.g., crossed a border of the secondary boundary). If it is determined that the mobile device has not yet entered the enclosed area, operations resume at 806, and the mobile device continues to receive location data.

Figure 9B:
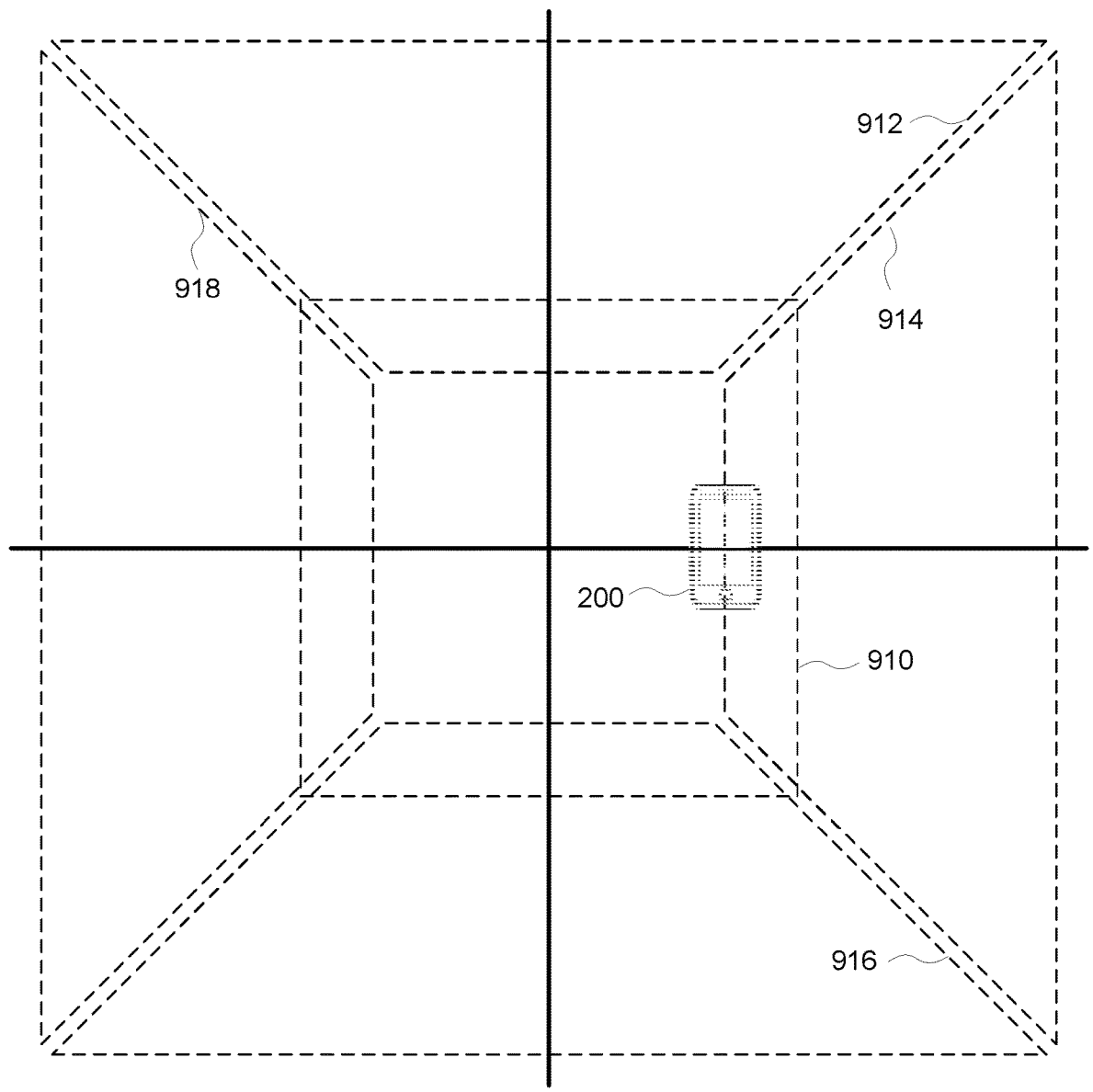

In the example of FIG. 9B, the mobile device 200 is shown crossing into secondary boundary 914. Upon the mobile device determining that it has entered the secondary boundary, at 810, the mobile device further determines whether it has exited the enclosed area of the main boundary (e.g., crossed a border of the main boundary). If it is determined that the mobile device has not yet exited the main boundary, operations resume at 806, and the mobile device continues to receive location data until the main boundary is exited.

Figure 9C:
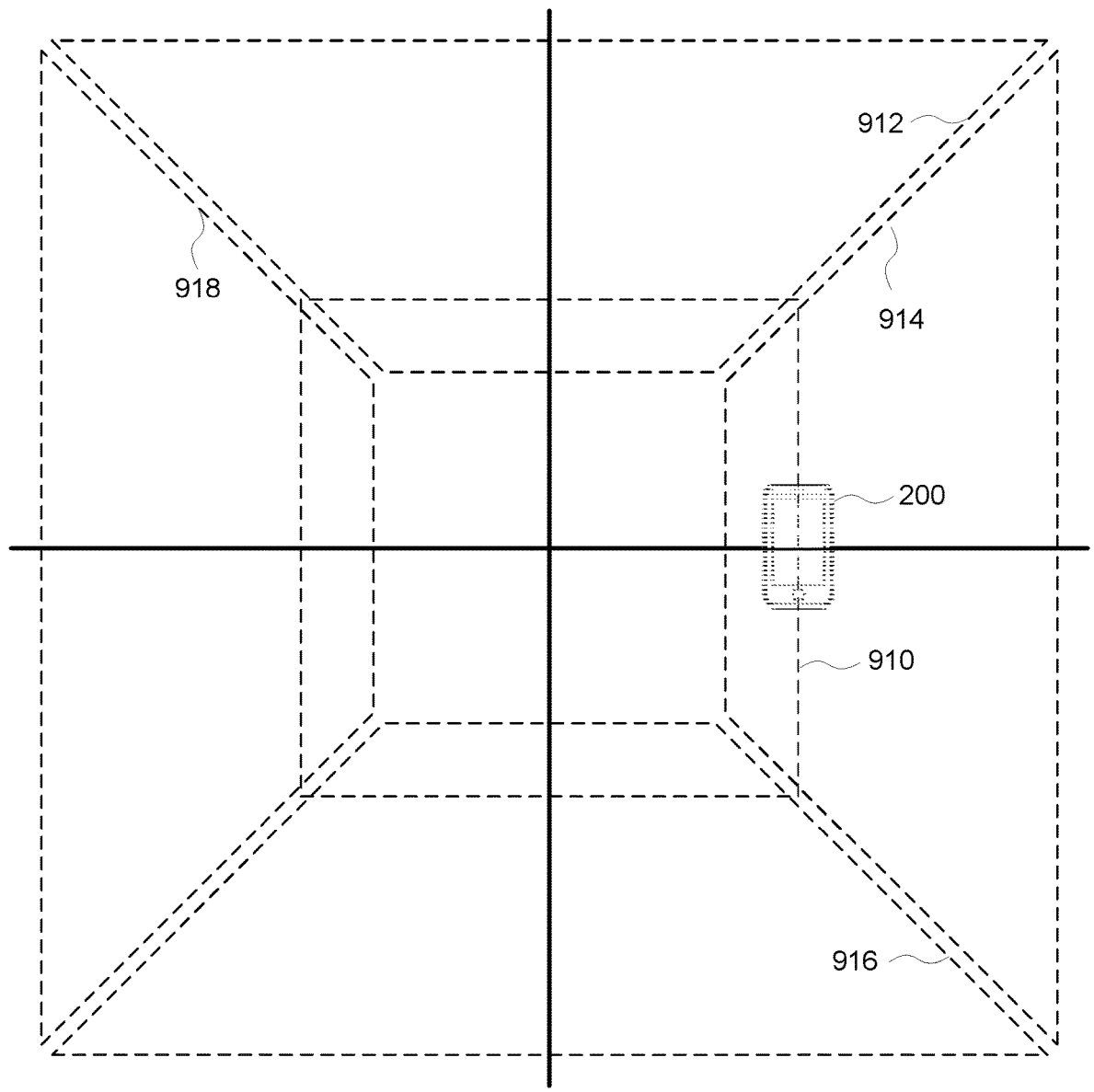

In the example of FIG. 9C, the mobile device 200 is shown crossing out of the main boundary 910. Upon the mobile device determining that is has exited the main boundary, at 812, the mobile device temporarily wakes up an application program, thereby enabling the application program to collect data (at least while woken up). At 814, the location data corresponding to the mobile device's location when the mobile device exits the main boundary is locally stored at the mobile device.

Figure 9D:
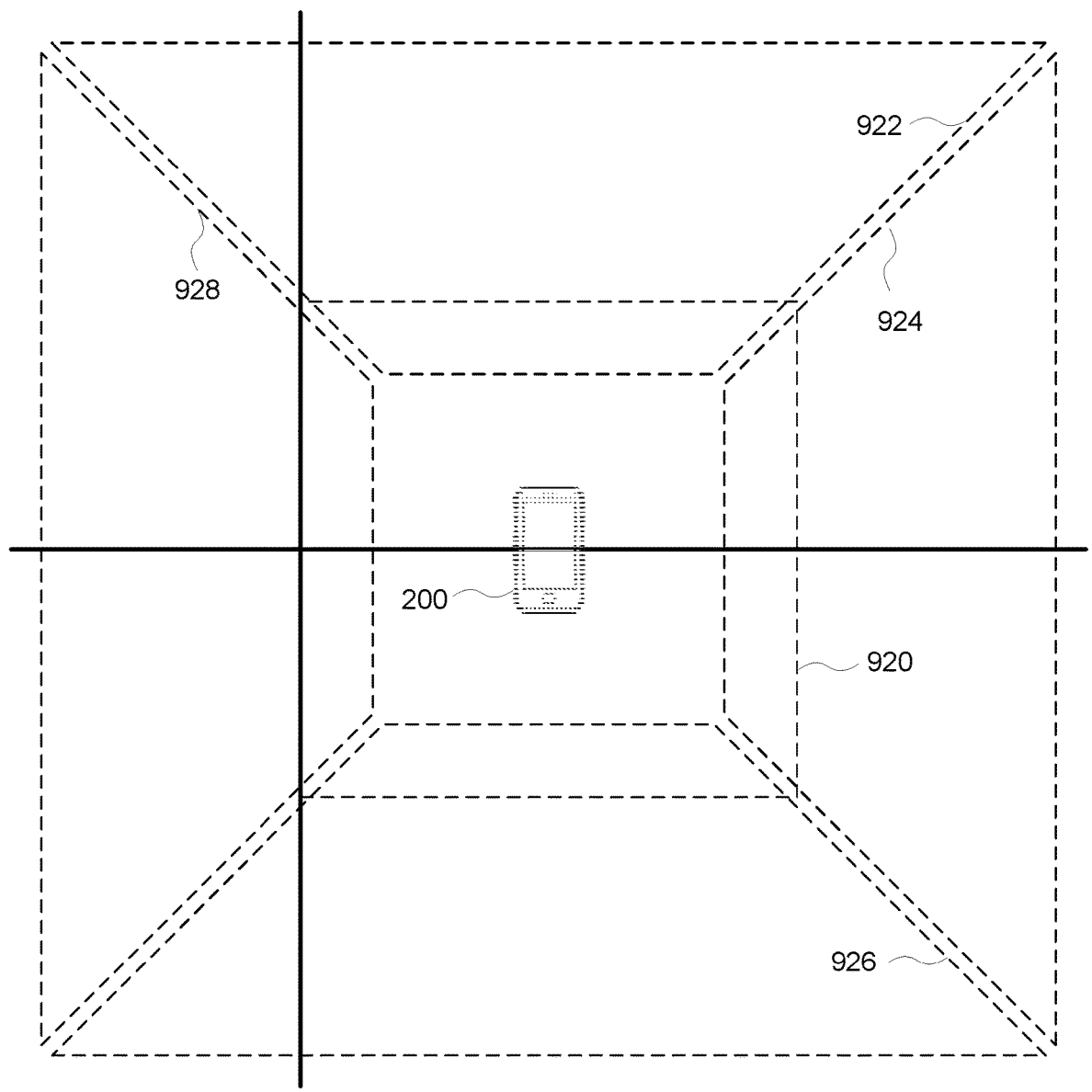

The routine 800 then repeats, beginning at 804, with generation of a new main boundary and plurality of secondary boundaries. FIG. 9D shows a new main boundary 920 enclosing an area including the new location of the mobile device 200, and new plurality of secondary boundaries 922, 924, 926 and 928 enclosing areas that do not include the current location of the mobile device 200. As with the previous examples, the main boundary 920 and the secondary boundaries 922, 924, 926 and 928 are arranged such that when the mobile device continues to move, it will cross a border of at least one of the secondary boundaries before it exits the main boundary.

The above illustrated examples generally show a smartphone changing location. However, the same or similar principles may be applied for any mobile device that is capable of determining its own position (e.g., a car including a GPS navigator) if it is desired that an application programmed on the device collect data while operating in the device's background.

Additionally, in each of the above described routines, the OS may be programmed with instructions for identifying boundary crossings, and an SDK may be programmed with instructions for generating the boundaries.

The SDK may also be programmed with instructions for determining whether to generate a main boundary. For instance, it may be required to generate a main boundary in any situation in which two or fewer secondary boundaries are generated. Conversely, generating a main boundary may be optional or restricted when three or more secondary boundaries are generated.

The SDK may also be programmed with instructions for determining the size of the main and secondary boundaries. For instance, the radius of the main boundary may be selected from a preselected range of possible radii. The main boundary minimum radius $R_{MIN}$ can be as small as is permitted by the device. This may depend on the ability of the device to accurately identify the position of the mobile device, which may depend on the precision of hardware being used to track location (e.g., GPS, IPS). The minimum radius size may also depend on limitations programmed into the OS, whereby the OS may not permit defining a geofence having a radius smaller than a preselected threshold distance. In some cases, this radius may be about 100 meters. In other cases, the minimum radius may be about 200 meters.

The main boundary maximum radius $R_{MAX}$ may be as large as is permitted by the device, application program or SDK. In some cases, $R_{MAX}$ may be limited by the total number of secondary boundaries selected to surround the mobile device. For instance, if it is desired that the secondary boundaries completely surround the mobile device, then the fewer secondary boundaries that are used, the closer they may be positioned to the mobile device to ensure that the mobile device is completely surrounded. This in turn sets a practical limit on the radius of the main boundary. In such cases, $R_{MAX}$ may defined based on the following formula:

$$R_{MAX}=R_{MIN}/\sin(\pi/N) \qquad (1)$$

in which N is the total number of secondary boundaries. Alternatively or additionally, $R_{MAX}$ may be capped at a fixed maximum distance, such as about 5 kilometers.

The radius of each secondary boundary may be similarly determined to be between $R_{MIN}$ and $R_{MAX}$. In the examples of FIGS. 8 and 9A-D, in which both main and secondary boundaries are utilized, each secondary boundary has the same radius as the main boundary. Alternatively, the secondary boundaries may have the same radius as one another (e.g., the minimum radius), but a different (e.g., smaller) radius than that of the main boundary. For example, the main boundary may have a radius somewhere between $R_{MIN}$ and $R_{MAX}$, whereas each secondary boundary may have a radius of $R_{MIN}$.

The SDK may further be programmed with instructions for determining the location of each boundary. In the case of a main boundary, as a default, the main boundary may be centered around the location of the mobile device. In the case of the N secondary boundaries surrounding the mobile device, each secondary boundary may be centered at a latitude and longitude relative to the location of the mobile device using the following formulas:

$$\text{Longitude}=x_0+D^*\cos(2\pi i/N)/\cos(2^*y_0/360°) \qquad (2)$$

$$\text{Latitude}=y_0+D^*\sin(2\pi i/N) \qquad (3)$$

in which $x_0$ is the longitude of the mobile device, $y_0$ is the latitude of the mobile device, D is the distance of each secondary boundary from the mobile device, and each secondary boundary is assigned an integer value "i" between 1 and N (or between 0 and N-1). In one example, the distance D may be equal to $R_{MAX}$. In such an example, if each of the N secondary boundaries has a radius of $R_{MIN}$, the secondary boundaries would fit in a circle around the mobile device, with each secondary boundary tangenting the adjacent secondary boundaries. In another example, the distance D may be equal to $R_{MAX}*K$, in which K is a correction factor used to ensure that the secondary boundaries overlap with one another. In such an example, K is a value less than or equal to unity, such that the distance D is less than $R_{MAX}$ by K %. For example, if K=0.99 (or 99%), then each secondary boundary will be shifted slightly towards the mobile device. This results in a small overlap (approximately (1-K)%) between the adjacent secondary boundaries, instead of the boundaries overlapping one another.

The above techniques and formulas may be applied to ensure that the secondary boundaries overlap with one another. Additionally, in situations where both main and secondary boundaries are utilized, the above techniques and formulas may be applied to ensure that the main boundary overlaps with each of the secondary boundaries (for instance, as shown in FIGS. 8 and 9A-9D).

The above formulas generally describe determining latitude and longitude distances in terms of degrees. However, those skilled in the art will recognize that such measurements may be converted from degrees of latitude and longitude to metric distances (e.g., meters), for any generally spherical body or planet. For instance, a distance D between two points on the surface of the Earth may be converted using the following formula:

$$D_{degrees}=D_{meters}*(360°/(2\pi*(\text{Planet's Radius}))) \qquad (4)$$

in which the value "Planet's Radius" is the Earth's radius, or approximately 6,378,137 meters.

In some cases, the mobile device OS may be programmed to receive a static geofence or library of static geofences (e.g., received via the receiver 264 of the mobile device 200 in FIG. 2), and to activate the app when the mobile device crosses a border of a received static geofence. The static geofence may enclose a region of interest for which it may be desired to collect data about the user's movement. Such regions may include a store, group of stores, building, parking lot, neighborhood, town, city, etc. Generally, the size of the main and secondary boundaries dynamically generated by the SDK of the present application are smaller than the size of a static geofence. Thus, even in those situations where the OS automatically wakes up the app based on a static geofence crossing, the SDK of the present disclosure may cause the OS to automatically wake up the app more often.

The above examples generally describe automatic activation of an app stored on a mobile device based on geofences or geofence-like borders. It will be recognized that application programs may also be manually activated by a user, and may collect data as well as trigger generating of dynamic geofences when manually activated, regardless of whether or not a boundary has been crossed. Alternatively or additionally, when an app is moved from the foreground of the device to the background (e.g., the app is manually or automatically deactivated, such as after a period of inactivity), moving the app from its foreground state to its background state may initiate any of the above described routines so that data may continue to be collected by the app while it remains in the background state. Alternatively or additionally, in a situation where the OS is programmed to determine that there is an opportunity to run code in the background of the mobile device, and temporarily activates the background app based on this determination, the app may be programed to call the SDK upon temporary activation so that a geofence is generated.

The above examples also generally describe methods for increasing the frequency at which data is collected by an app included in a mobile device. Nonetheless, it should be recognized that the same or similar principles may be applied to decrease the frequency at which data is collected. For instance, the dynamically generated geofences may be so large that the mobile device may cross the generated boundaries less frequently than the operating system would have otherwise activated the app. Similarly, the dynamically generated geofences may have a size that is larger than the size of the otherwise-utilized static geofence(s), such that the app is activated less frequently.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method performed on a mobile device, wherein the mobile device includes an operating system configured to track a current location of the mobile device based on location data collected from hardware of the mobile device, the operating system being further configured to control permission for an application program included in the mobile device to access, collect or store data based on a set of one or more custom virtual borders, and wherein the mobile device further includes a software component external from the operating system and in communication with the operating system for providing the set of one or more custom virtual borders, wherein the method is performed by the software component and comprises:

the software component receiving the location data indicating the current location of the mobile device;

the software component generating the set of one or more custom virtual borders around the current location based on the received location data;

the software component providing the generated set of custom virtual borders to the operating system, thereby causing the operating system to permit the application program to access, collect or store data only when the mobile device crosses one or more of the custom virtual borders;

upon the mobile device crossing the one or more custom virtual borders, the software component automatically receiving new location data indicating a new current location of the mobile device and generating a new set of custom virtual borders around the new current location based on the new location data; and the software component providing the new set of custom virtual borders to the operating system, thereby causing the operating system to permit the application program to access, collect or store data only when the mobile device crosses one or more of the new custom virtual borders.

2. The method of claim 1, further comprising:
logging the received location data; and
instructing the mobile device to transmit the logged data to a remote location.

3. The method of claim 1, wherein generating the set of custom virtual borders comprises generating a main boundary enclosing an area including the current location of the mobile device, and wherein the software component instructs the operating system to permit the application program to access, collect or store data when the mobile device enters or exits the enclosed area.

4. The method of claim 1, wherein generating the set of custom virtual borders comprises generating a plurality of secondary boundaries, each secondary boundary enclosing an area not including the current location of the mobile device, and wherein the software component instructs the operating system to permit the application program to access, collect or store data when the mobile device enters one of the enclosed areas of the secondary boundaries.

5. The method of claim 1, wherein generating the set of custom virtual borders comprises generating a main boundary enclosing an area including the current location of the mobile device and a plurality of secondary boundaries, each secondary boundary enclosing an area not including the current location of the mobile device, and wherein the software component instructs the operating system to permit the application program to access, collect or store data when the mobile device exits the enclosed area of the main boundary and enters one of the enclosed areas of the secondary boundaries.

6. The method of claim 5, wherein the main boundary overlaps each of the secondary boundaries, such that the mobile device enters a secondary boundary before exiting the main boundary.

7. The method of claim 5, wherein the number of boundaries included in the set of custom virtual border is less than the maximum number of geofence regions that the mobile device is operable to monitor.

8. The method of claim 5, further comprising the software component determining at least one of:
a radius of the main boundary of the set of custom virtual borders; and
a distance between a centerpoint of the main boundary and a centerpoint of a secondary boundary,
based on the number of secondary boundaries that are generated.

9. The method of claim 5, wherein the software component generates at least one secondary boundary of the set of custom virtual borders having a radius of between about 100 meters and about 200 meters.

10. The method of claim 1, further comprising the software component instructing the operating system to temporarily activate the application, thereby enabling the application to collect location data indicating a current location of the mobile device.

11. The method of claim 10, wherein the location data comprises one or more of an identification of the mobile device, a timestamp associated with the location data, and an indication of either or both horizontal and vertical accuracy of the mobile device's position.

12. The method of claim 1, wherein the operating system restricts how frequently the program application is temporarily activated, whereby said restriction reduces drainage of a battery of the mobile device.

13. The method of claim 1, wherein the software component is included within the application.

14. The method of claim 1, wherein the location data received by the software component is collected by data collection hardware included in the mobile device, and wherein the operating system is configured to control transmission of the location data from the data collection hardware to the software component.

15. A non-transitory computer-readable storage medium of a mobile device, including an operating system configured to track a current location of the mobile device based on location data collected from hardware of the mobile device, the operating system being further configured to control permission for an application program included in the mobile device to access, collect or store data based on a set of one or more custom virtual borders, the storage medium having encoded thereon a software component external from the operating system and in communication with the operating system for providing the set of one or more custom virtual borders, wherein the software component comprises instructions configured to:
receive the location data indicating the current location of the mobile device;
generate the set of custom virtual borders around the current location of the mobile device based on the received location data;
provide the generated set of custom virtual borders to the operating system, thereby causing the operating system to permit the application program to access, collect or store data only when the mobile device crosses one or more of the custom virtual borders;

upon the mobile device crossing the one or more custom virtual borders, automatically receive new location data indicating a new current location of the mobile device and generate a new set of custom virtual borders around the new current location based on the new location data; and provide the new set of custom virtual borders to the operating system, thereby causing the operating system to permit the application program to access, collect or store data only when the mobile device crosses one or more of the new custom virtual borders.

16. The non-transitory computer-readable storage medium of claim 15, wherein the set of custom virtual borders is generated only when the application program is activated.

17. The non-transitory computer-readable storage medium of claim 15, wherein the data collected by the application program is stored on the non-transitory computer-readable storage medium of the device, and wherein the mobile device is further configured to transmit the stored data to a remote storage medium.

18. The non-transitory computer-readable storage medium of claim 15, wherein the set of custom virtual borders comprises a main boundary enclosing an area including the current location of the mobile device, and wherein the instructions are configured to permit the application program to access, collect or store data when the mobile device exits the enclosed area.

19. The non-transitory computer-readable storage medium of claim 15, wherein the set of custom virtual borders comprises a plurality of secondary boundaries, each secondary boundary enclosing an area not including the current location of the mobile device, and wherein the instructions are configured to permit the application program to access, collect or store data when the mobile device enters one of the enclosed areas of the secondary boundaries.

20. The non-transitory computer-readable storage medium of claim 15, wherein the set of custom virtual borders comprises a main boundary enclosing an area including the current location of the mobile device and a plurality of secondary boundaries, each secondary boundary enclosing an area not including the current location of the mobile device, and wherein the instructions are configured to permit the application program to access, collect or store data when the mobile device exits the enclosed area of the main boundary and enters one of the enclosed areas of the secondary boundaries.

21. The computer-readable storage medium of claim 15, wherein the operating system is configured to restrict the application program from causing the processor to collect data, whereby said restriction reduces drainage of a battery of the mobile device.

22. A mobile device comprising:
a receiver for receiving location data indicating a current location of the mobile device;
a processor; and
a non-transitory computer-readable storage medium having encoded thereon:
an operating system configured to cause the processor to control operations of the mobile device;
a software component external from the operating system; and
an application program interface for enabling communication between the operating system and the software component,
wherein the operating system is configured to track the mobile device based the location data, and to control permission for an application program included in the mobile device to access, collect or store data based on a set of one or more custom virtual borders, and wherein the software component comprises instructions configured to cause the processor to:
receive the location data indicating the current location of the mobile device;
generate the set of custom virtual borders around the current location of the mobile device based on the received location data;
provide the generated set of custom virtual borders to the operating system, thereby causing the operating system to permit the application program to access, collect or store data only when the mobile device crosses one or more of the custom virtual borders;
upon the mobile device crossing the one or more custom virtual borders, automatically receive new location data indicating a new current location of the mobile device and generate a new set of custom virtual borders around the new current location based on the new location data; and
provide the new set of custom virtual borders to the operating system, thereby causing the operating system to permit the application program to access, collect or store data only when the mobile device crosses one or more of the new custom virtual borders.

23. The mobile device of claim 22, further comprising a transmitter to transmit the stored location data to a remote storage medium, wherein the processor is further configured to erase the stored location data from the local storage medium after the stored location data is transmitted to the remote storage medium.

24. A mobile device comprising:
a receiver for receiving location data indicating a current location of the mobile device;
a processor for controlling operations of the mobile device; and
a non-transitory computer-readable storage medium having encoded thereon:
an operating system configured to cause the processor to control operations of the mobile device;
a software component external from the operating system; and
an application program interface for enabling communication between the operating system and the software component,
wherein the software component comprises instructions configured to cause the processor to:
dynamically generate a set of one or more virtual borders around a current location of the mobile device; and
transmit the generated set of custom virtual borders to the operating system;
wherein the operating system is programmed to, detect the mobile device crossing one or more of the dynamically generated virtual borders based on the received location data; and
wherein the operating system is further programmed to temporarily enable an application programmed on the mobile device to collect and store data upon detecting the mobile device crossing one or more of the dynamically generated virtual borders,
and wherein the software component comprises instructions further configured to cause the processor to automatically dynamically generate an updated set of virtual borders around the detected location of the mobile device upon the operating system detecting the mobile device crossing one or more of the dynamically generated virtual borders.

25. The mobile device of claim 24, further comprising a transmitter, and wherein the program instructions are further configured to cause the processor to:
- store location data corresponding to the location of the mobile device when one or more of the dynamically generated virtual borders is crossed; and
- transmit the stored location data to a remote location.

* * * * *